United States Patent [19]

Wu et al.

[11] Patent Number: 5,331,496

[45] Date of Patent: Jul. 19, 1994

[54] THIN-FILM MAGNETIC TRANSDUCER WITH A MULTITUDE OF MAGNETIC FLUX INTERACTIONS

[75] Inventors: Andrew L. Wu; Sharat Batra, both of Shrewsbury, Mass.

[73] Assignee: Digital Equuipment Corporation, Maynard, Mass.

[21] Appl. No.: 837,358

[22] Filed: Feb. 14, 1992

[51] Int. Cl.$^5$ .......................... G11B 5/147; G11B 5/17
[52] U.S. Cl. ...................................... 360/126; 29/603; 360/123
[58] Field of Search ....................... 360/126, 125, 123; 428/336; 29/603

[56] References Cited

U.S. PATENT DOCUMENTS

| | | | |
|---|---|---|---|
| 4,165,525 | 8/1979 | Koel et al. | 360/125 |
| 4,223,360 | 9/1980 | Sansom et al. | 360/123 |
| 4,335,410 | 6/1982 | Neu | 360/123 |
| 4,374,403 | 2/1983 | Oshima et al. | 360/113 |
| 4,376,337 | 3/1983 | Kobayasi et al. | 29/603 |
| 4,535,375 | 8/1985 | Mowry et al. | 360/113 |
| 4,566,050 | 1/1986 | Beam et al. | 360/113 |
| 4,613,918 | 9/1986 | Kanai et al. | 360/113 |
| 4,626,946 | 12/1986 | Vinal | 360/113 |
| 4,626,947 | 12/1986 | Narishige et al. | 360/126 |
| 4,639,811 | 1/1987 | Diepers et al. | 360/125 |
| 4,649,447 | 3/1987 | Huang et al. | 360/113 |
| 4,663,685 | 5/1987 | Tsang | 360/113 |
| 4,668,913 | 5/1987 | Vinal | 324/235 |
| 4,695,351 | 9/1987 | Mallary | 204/15 |
| 4,698,711 | 10/1987 | Vinal | 360/113 |
| 4,803,580 | 2/1989 | Mowry | 360/113 |
| 4,816,947 | 3/1989 | Vinal et al. | 360/113 |
| 4,825,318 | 4/1989 | Hoo et al. | 360/121 |
| 4,885,649 | 12/1989 | Das et al. | 360/113 |
| 4,891,725 | 1/1990 | Mowry | 360/113 |
| 4,912,584 | 3/1990 | Mallary et al. | 360/126 |
| 4,935,832 | 6/1990 | Das et al. | 360/112 |
| 5,081,554 | 1/1992 | Das | 360/113 |
| 5,108,837 | 4/1992 | Mallary | 360/126 |
| 5,111,352 | 5/1992 | Das et al. | 360/113 |
| 5,184,267 | 2/1993 | Mallary | 428/336 |
| 5,195,005 | 3/1993 | Mallary et al. | 360/126 |

FOREIGN PATENT DOCUMENTS

52-70015  6/1977  Japan .

OTHER PUBLICATIONS

M. Mallary et al., *J. Appl. Phys.* 67(9): 4863–4865, (1990).
M. Mallary et al., *IEEE Transactions on Magnetics*, 25(5): 1334–1336, (1990).
M. Mallary et al., *IEEE Transactions on Magnetics*, 24(6): 2374–2376, (1988).

*Primary Examiner*—A. J. Heinz
*Assistant Examiner*—Paul J. Ditmyer
*Attorney, Agent, or Firm*—Albert P. Cefalo; James F. Thompson

[57] ABSTRACT

A thin film magnetic head, and process for making the same, features a thin film magnetic transducer formed from multiple layers of film and having a magnetic yoke interacting with an electrical coil. The yoke has multiple magnetic flux circuits, deposited on multiple layers of film, encircling the center of the transducer and connected together by proximal and distal vias. A coil has multiple turns intertwined with the yoke, passing between the distal and proximal vias so that the distal vias are exterior to the coil and the proximal Vias are interior to the coil, to provide at least four magnetic flux interactions between the coil and the yoke. In preferred embodiments at least one layer of the film is deposited with at least two pole pieces having different easy axis orientations. In other preferred embodiments at least one distal via is configured as an elongated "flux strap" for conducting magnetic flux along the length of the via in a direction oblique to the easy axis of either pole piece coupled together by the magnetic flux strap.

15 Claims, 13 Drawing Sheets

LAYER C

LAYER A

- - - - LAYER A
——— LAYER C

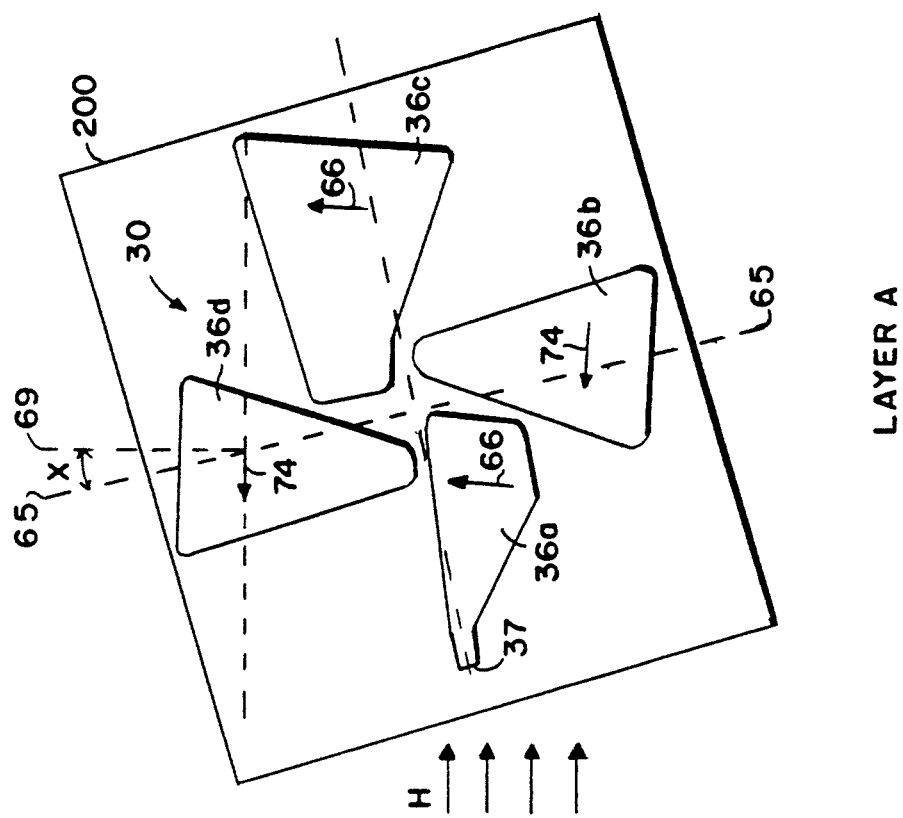
FIG. 15B LAYER A
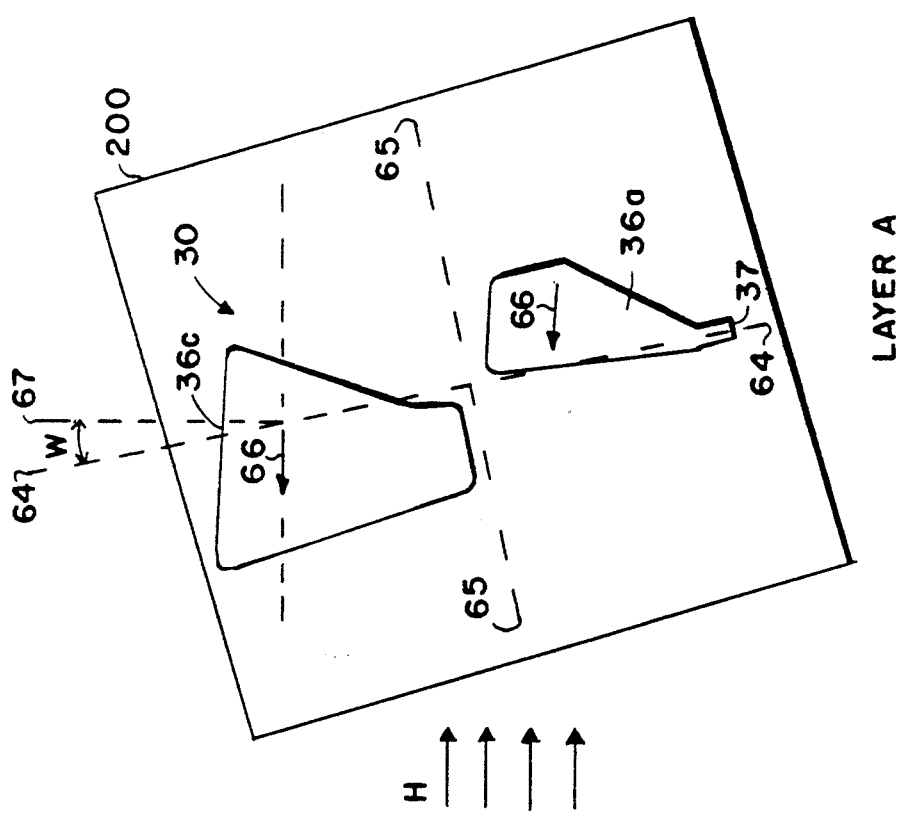
FIG. 15A LAYER A

LAYER C

LAYER C

THIN-FILM MAGNETIC TRANSDUCER WITH A MULTITUDE OF MAGNETIC FLUX INTERACTIONS

BACKGROUND OF THE INVENTION

This invention relates to thin film magnetic transducers, particularly magnetic read/write heads.

Referring to FIG. 1, a typical thin film magnetic head 10 for writing information on or reading information from a recording medium 12, such as a magnetic disk, resembles a horseshoe-shaped yoke 14 of ferromagnetic material (such as nickel-iron) around which a coil 16 is wrapped. Yoke 14 includes a pair of pole pieces 18 the tips of which are located closely adjacent to medium 12.

Information is written on medium 12 by passing electrical current through coil 16 to induce a corresponding magnetic flux in yoke 14. The magnetic flux is conducted through one of the pole pieces 18 to medium 12 via the tip of the pole piece. The magnetic flux circuit is completed by the return of the magnetic flux from medium 12 to the yoke via the other pole piece. Changes in the magnetic flux caused by varying the electrical current carried through the coil are recorded as magnetic transitions on medium 12. During reading, as head 10 is passed over a dipole pair of magnetic transitions, or "di-bit" 15, 16 on medium 12, magnetic flux emanating from positive transition 15 is conducted up through the one of the pole pieces 18 and returned by the other pole piece to the negative transition 16. The magnetic flux conduction through yoke 14 induces a corresponding electrical signal in coil 16.

The amount of magnetic flux imparted to the yoke during writing by the coil depends upon the write current level, the number of coil turns, and the magnetic reluctance of the pole, among other factors. Similarly, the level of the voltage induced in the coil during reading depends upon factors such as the number of coil turns, the strength of the magnetic flux presented to the coil as it travels through the yoke, and the magnetic reluctance of the yoke. The magnetic flux-current relationship in a magnetic head is termed the inductive coupling between the yoke and the coil.

Referring to FIGS. 2A-2C, the ferromagnetic material of the pole pieces 18 includes numerous microscopic regions, called domains 20, within which magnetic dipoles 22 of the material are aligned. The material is formed (by deposition or annealing) in the presence of a directional magnetic field to cause the dipoles 22 of some of the domains 20 to become aligned with (i.e., oriented at an angle of 0 degrees to 180 degrees to) the magnetic field direction. The resulting alignment of the dipoles is also a function of the shape of the pole pieces. The direction at which the dipoles are aligned represents the preferred axis of magnetization of the pole piece and is called the easy axis 24. The dipole alignment of the domains 20 in the interior of the material and the domains 20 near the edges of the material is such that the magnetic flux generated by the dipoles 22 remains within the material in the absence of an externally applied magnetic field (FIG. 2A).

When magnetic flux is applied to the yoke either by passing current through the coil during writing or by passing the pole 18 over magnetic flux transitions on the medium 12 during reading, the magnetic flux is conducted through the material in one of two ways. One way is by so-called "wall motion", which occurs when the magnetic flux 26 is applied in a direction parallel to the easy axis 24 (FIG. 2B). The magnetic flux 26 causes domains 20 having dipoles 22 that are aligned with the direction of magnetic flux conduction 26 to increase in size (at the expense of those domains whose dipoles are disposed opposite to the magnetic flux direction) as magnetic dipoles from adjacent domains reorient themselves (e.g., by 180 degrees) to become aligned with the direction of magnetic flux conduction. As each domain grows in size, its walls 21 move to define new boundaries between the domains.

Magnetic flux conduction by wall motion is undesirable for several reasons. First, defects, such as impurities, in the material impede the movement of the domain walls 21. When a domain wall encounters an impurity, the impurity temporarily holds (i.e., "pins") the wall at the site of the impurity, preventing it from moving at the point of the impurity. The remainder of the wall continues to move, causing the wall to "stretch" and storing energy in the wall. When the wall stores sufficient energy to free itself from the hold of the impurity, the wall breaks free suddenly, releasing the stored energy as a burst of electrical noise (known as "Barkhausen noise") which obscures the information signal.

The applied magnetic flux must exceed a threshold to assure that the walls 21 will be able to gather enough energy to move past the impurities. As a result, magnetic flux conduction by wall motion is relatively unresponsive to the low magnetic flux levels with which thin film heads are typically used during read operations (that is, the material has low permeability at low magnetic flux levels.)

In addition, the domain walls 21 cannot be rapidly moved, and as a result, magnetic flux conduction by wall motion is unsuitable in applications in which high frequency changes in magnetic flux are encountered.

A second mechanism by which magnetic flux is conducted through magnetic material is by rotation of the magnetic dipoles 22 of the domains. This is done by applying the magnetic flux 26 in a direction transverse (such as perpendicular) to the easy axis 24 (FIG. 2C). Because domain wall motion is not relied upon to conduct the magnetic flux, "pinning" is not encountered and Barkhausen noise is eliminated. Further, the domain dipoles 22 need only rotate slightly to conduct the magnetic flux through the material. As a result, magnetic flux conduction by rotation is responsive to high frequency magnetic flux variations as well as low applied magnetic flux levels. That is, the magnetic permeability of the material is high even at low levels of applied magnetic flux.

SUMMARY OF THE INVENTION

The present invention provides a thin film magnetic head, and process for making the same, which achieves high signal levels through improved inductive coupling between the yoke and the coil components of the head. The head achieves a high number of effective coil turns by providing at least four magnetic flux interactions between the coil and yoke. Furthermore, the present invention maintains a small footprint and a high degree of symmetry which allows it to fit on a relatively narrow railwidth, e.g., a conventional slider mechanism.

In general, in one aspect, the invention features a thin film magnetic transducer formed from multiple layers of film and having a magnetic yoke interacting with an electrical coil. The yoke has multiple magnetic flux circuits encircling the center of the transducer, and each magnetic flux circuit has two terminal ends for coupling magnetic flux into and out of the magnetic flux circuit. Each magnetic flux circuit includes at least two pole pieces disposed in at least two layers of the film and which are magnetically coupled together through a "distal" via. Each terminal end of at least one magnetic flux circuit is magnetically coupled to the terminal end of another magnetic flux circuit through a "proximal" via, which is located closer to the center of the transducer than the "distal" via. Each pole piece has an easy axis of magnetization oriented substantially perpendicular to the desired direction of magnetic flux conduction along the magnetic flux circuit. A coil having multiple turns is intertwined with the yoke, passing between the distal and proximal vias so that the distal vias are exterior to the coil and the proximal vias are interior to the coil, to provide at least four magnetic flux interactions between the coil and the yoke.

In other preferred embodiments of the transducer each magnetic flux circuit has a first pole piece coupled to a second pole piece at a "distal" via. The direction of magnetic flux conduction in the first pole piece substantially perpendicular to the easy axis of the first pole piece and the direction of magnetic flux conduction in the second pole piece substantially perpendicular to the easy axis of the second pole piece intersect at the distal via coupling the first and second pole pieces. At least one layer of the film is deposited with at least two pole pieces having different easy axis orientations. The pole pieces have an easy axis forming an oblique angle of substantially 15° with the longitudinal or lateral axis of the transducer.

Preferred embodiments of the thin film transducer include tip pole pieces having one end for positioning adjacent to a magnetic medium for coupling magnetic flux from the medium into the yoke, and having another end magnetically coupled to a terminal end portion of a magnetic flux circuit through a proximal via.

Still other preferred embodiments of the transducer have at least one distal via configured as an elongated "flux strap" for conducting magnetic flux along the length of the via in a direction oblique to the easy axis of either pole piece coupled together by the magnetic flux strap. The magnetic flux strap is substantially parallel to the longitudinal axis of the transducer. The easy axis of all pole pieces deposited on the same layer are oriented in the same direction, and the easy axis of the pole pieces on each layer form an oblique angle of between 25° and 45° with the lateral axis of the transducer. Preferably, the pole pieces on each layer form an oblique angle of substantially 35° with the lateral axis of the transducer.

In yet other preferred embodiments, the transducer has at least one magnetic flux circuit having a first pole piece coupled to a second pole piece at a distal via. The direction of magnetic flux conduction in the first pole piece substantially perpendicular to the easy axis of the first pole piece and the direction of magnetic flux conduction in the second pole piece substantially perpendicular to the easy axis of the second pole piece do not intersect at the distal via coupling the first and second pole pieces. The distal via coupling the first and second pole pieces is an elongated "flux strap" for conducting magnetic flux along the length of the via in a direction oblique to the easy axis of either the first or second pole piece.

In general, in another aspect, the present invention features a method for manufacturing a thin film magnetic transducer including first depositing magnetic pole pieces onto the first layer of a substrate in the presence of a magnetic field to induce an easy axis in these pole pieces having a first orientation. The substrate is then reoriented relative to the magnetic field and more magnetic pole pieces are deposited onto the first layer of the substrate in the presence of the magnetic field to induce an easy axis in these pole pieces having a second orientation. Electrical coil and insulation layers are next formed on the first layer of the substrate. The substrate is then reorienting relative to the magnetic field and magnetic pole pieces are deposited onto the insulating layer in the presence of the magnetic field to induce an easy axis in these pole pieces having a third orientation. The substrate is then reoriented again relative to the magnetic field and more magnetic pole pieces are deposited onto substrate in the presence of the magnetic field to induce an easy axis in these pole pieces having a fourth orientation.

In preferred embodiments of the manufacturing method the first, second, third, and fourth orientations are all different from one another. Other preferred embodiments of the method include hard baking the substrate to form the electrical coil and insulation layers, and depositing the pole pieces on the first layer includes adjusting the orientation of the substrate relative to the magnetic field to compensate for reduction in the first and second easy axis orientations due to the hard baking step.

Thus, the invention described herein offers the advantages of providing a thin film magnetic transducer having improved inductive coupling and an increased signal to noise ratio (S/N) over conventional transducers, while maintaining compatibility with existing transducer form factors and manufacturing processes.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being place upon illustrating the principles of the invention.

FIGS. 15A-15D illustrate the fabrication of the thin film magnetic head of FIG. 5.

DESCRIPTION OF THE PREFERRED EMBODIMENTS

Structure and Operation

Figure 1:
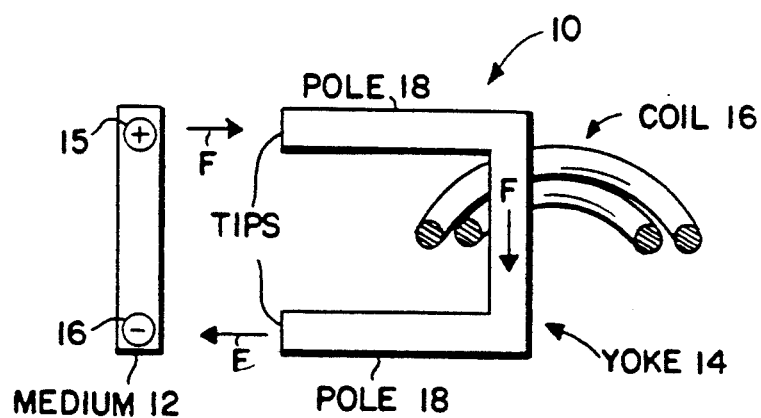
FIG. 1 is a diagrammatic side view of a prior art magnetic head.
Figure 3:
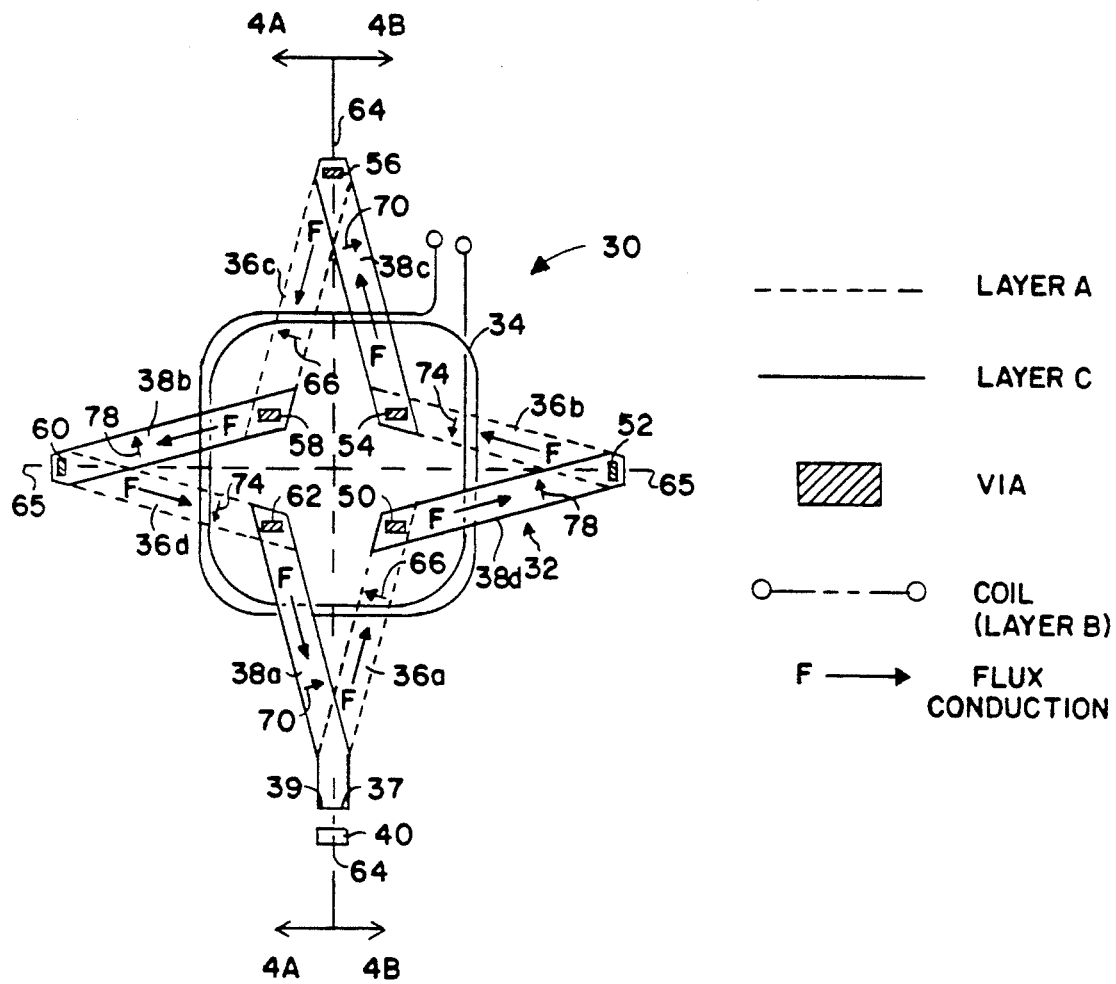
FIG. 3 is a schematic top view of a preferred embodiment of a thin film magnetic head of this invention featuring a four-fold relative signal increase over the magnetic head of FIG. 1.

FIG. 3 shows a schematic drawing of a thin film magnetic head 30 which includes a yoke 32 of ferromagnetic material (such as a nickel iron alloy) intertwined with a multi-turn, planar coil 34 (also known as a pancake coil). Yoke 32 and planar coil 34 are intertwined with each other in such a way as to provide four magnetic flux interactions between yoke 32 and coil 34 and thereby significantly increase the inductive coupling therebetween as compared with conventional thin film magnetic heads (FIG. 1).

Specifically, yoke 32 is constructed from eight elongated magnetic pole pieces 36a-36d and 38a-38d connected together to form a magnetic flux circuit for conducting magnetic flux from the leading pole to the trailing pole of the head. The pole pieces are woven around coil 34 so that magnetic flux conducted in the pole pieces interacts with coil 34 four times as the magnetic flux is conducted through pole pieces 36a-36d and 38a-38d to or from magnetic storage medium 40.

Figure 4A:
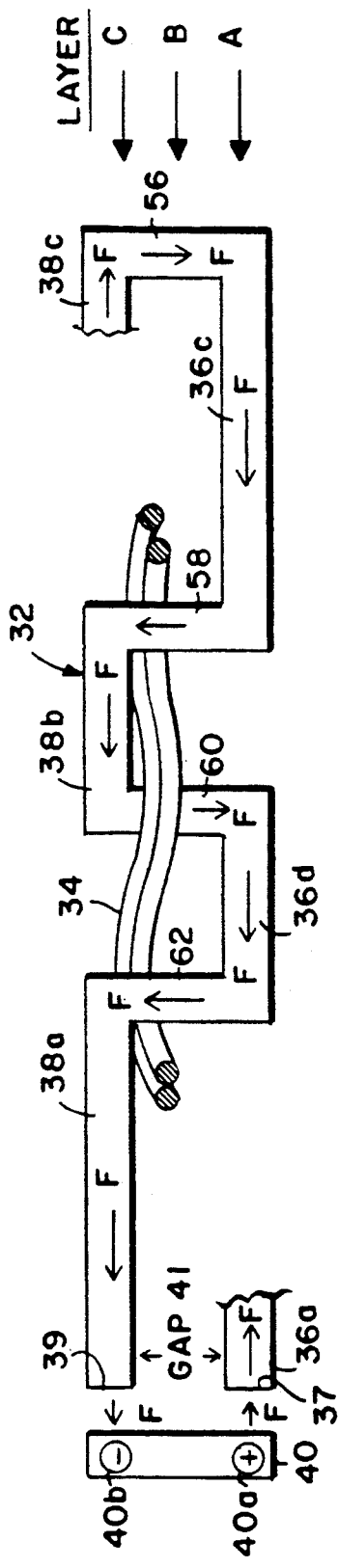
FIGS. 4A and 4B are diagrammatic side and partial cross-sectioned views of the thin film magnetic head of FIG. 3 taken through lines 4A—4A and 4B—4B of FIG. 3, respectively.
Figure 4B:
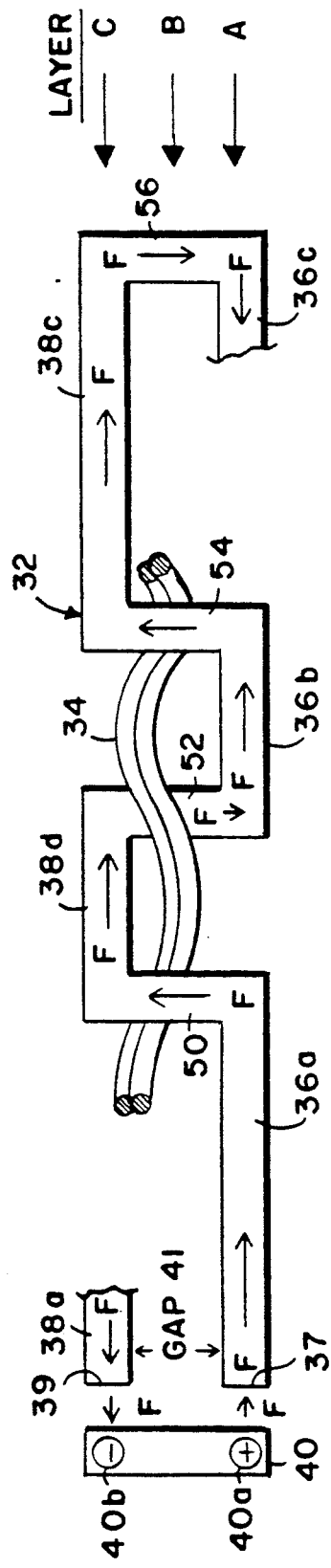

Referring also to FIGS. 4A and 4B, pole piece 36a-36d lie in a single thin-film layer, layer A, and pole pieces 38a-38d lie in second thin-film layer, layer C. Coil 34 lies in a third thin-film layer, layer B, disposed between layers A and C. Coil 34 generally defines a perimeter about an area of Layer B referred to as "interior to the coil", and the remaining area of Layer B is referred to as "exterior to the coil". Layer B also serves as a transition layer to magnetically separate pole pieces 36a-36d from pole pieces 38a-38d. One end of pole piece 36a is disposed adjacent to storage medium 40 and serves as pole tip 37 for magnetically soupling the yoke 32 to the storage medium. Similarly, one end of pole piece 38a is disposed adjacent to storage medium 40 and serves as pole tip 39 for magnetically coupling yoke 32 to the storage medium. Tips 37 and 39 are spaced by a gap 41 having a predetermined thickness to optimize the linear density of recording on the medium.

Pole pieces 36a-36d are alternately connected end-to-end with pole pieces 38d-38a to form the yoke 32. Proximal Vias 50, 54, 58, 62 are placed so that they traverse layer B through the area which is interior to the coil 34. Positioned alternately with the proximal vias, distal vias 52, 56, 60 are placed such that they traverse Layer B through the area which is exterior to coil 34. Such positioning of the proximal and distal vias has the effect of wrapping the pole pieces of yoke 32 around the coil 34 which increases the number of magnetic flux interactions between the coil and the yoke. Specifically, the end of pole piece 36a (FIG. 4B) opposite tip end 37 is connected to one end of pole piece 38d through a via 50 traversing layer B. Via 50 provides a magnetic flux conduction path from pole piece 36a to pole piece 38d through the area interior to coil 34 (FIG. 3), thereby providing the first of four magnetic flux interactions between the yoke and the coil. The other end of pole piece 38d is connected to one end of pole piece 36b through another via 52 which similarly traverses layer B (FIG. 4B). Via 52, unlike via 50, passes through the area of layer B exterior to coil 34. The other end of pole piece 36b is connected to one end of pole piece 38c through a via 54 which passes through the layer B area interior to coil 34, thereby providing the second magnetic flux interaction. The remaining pole pieces are similarly connected end-to-end so that vias 56 and 60 traverse the area of layer B external to the coil, and vias 58 and 62 (FIG. 4A) traverse the area of layer B interior to the coil thereby providing the third and fourth magnetic flux interactions, respectively.

Regarding the geometry of the thin film magnetic head of FIG. 3, pole piece pairs (38d, 36b), (38c, 36c), and (38b, 36d), each make up a magnetic flux circuit portion having two pole pieces each disposed in a different layer of the film. Each pole piece pair is connected together to form the magnetic flux circuit portion with a respective distal via exterior to the coil 34. The magnetic flux circuit portions are connected to either another magnetic flux circuit portion, or to a pole piece having a pole tip (i.e., 36a or 38a), with a proximal via interior to the coil 34. Stated another way, the coil is threaded between a set of interior and exterior (i.e., proximal and distal) vias for each magnetic flux circuit portion. Furthermore, although thin film head 30 is shown with three such magnetic flux circuit portions, more magnetic flux circuit portions may be added in a similar manner to further increase the number of magnetic flux interactions between the coil and the yoke.

In use, considering a read operation of a magnetic di-bit having a pair of magnetic transitions 40a and 40b on storage medium 40 (FIGS. 4A and 4B), magnetic flux emanating from positive transition 40a enters the tip 37 of pole piece 36a, travels through yoke 32, and returns to negative transition 40b from the tip 39 of pole piece 38a. As the magnetic flux is conducted through pole pieces 36a-36d and 38a-38d, it passes through the Layer B area interior to coil 34 four times in the same direction (i.e., upward as shown in FIGS. 4A and 4B)—one pass for each of the magnetic flux couplings between Layers A and C through proximal vias 62, 58, 54, and 50.

The electrical signal induced in coil 34 by the passage of magnetic flux through pole piece pair (38a,36d) adds to the electrical signal generated in coil 34 by the conduction of the same magnetic flux through pole piece pairs (38b,36c) (38c,36b) and (38d,36a) resulting in a four-fold increased signal relative to a head in which the magnetic flux passes through the coil only once. In general, if the number of coil turns around a magnetic yoke is designated by (n), and the number times the yoke passes through the coil is designated by (m), an (n×m) improvement over a single turn coil and single pass yoke is realized by the present invention. Thus, the four-pass configuration shown in FIGS. 3, 4A and 4B is equivalent to quadrupling the effective number of turns of coil 34 without physically increasing the number of turns.

Increasing the effective number of turns without the need to physically build more turns into the coil has a number of advantages. Because the actual length of the coil need not be increased, increases in processing complexity, overall coil inductance, and total coil resistance are minimized.

In operation, magnetic flux conducts more easily at high frequencies (i.e., >20 MHz) by rotation than by domain wall movement. Stated another way, conduction by domain wall motion presents a higher impedance to the conduction of magnetic flux than does conduction by rotation at high frequencies. The thin film magnetic head 30 of FIG. 3 is constructed to reduce the contribution of conduction by wall motion by orienting the magnetic easy axis of each pole piece perpendicular to the desired direction of magnetic flux conduction. Consequently magnetic flux is substantially conducted by rotation in the present invention head 30. This is accomplished as follows. Each ferromagnetic pole piece 36a-36d and 38a-38d is formed in the presence of a magnetic field to have an easy axis that is in the plane of the pole piece and canted at a predetermined angle with respect to the longitudinal axis 64 (FIG. 3) of the head 30 to facilitate magnetic flux conduction through the pole piece.

Specifically, pole pieces 36a and 36c have a desired magnetic flux conduction path (F) disposed at an oblique angle to the longitudinal axis 64 and thus have identical easy axis 66 oriented perpendicular to the desired magnetic flux conduction path in the pole piece. Pole pieces 38a and 38c also have a desired magnetic flux conduction path disposed at an oblique angle to the longitudinal axis 64 (opposite to that of pole pieces 36a and 36c) and also have identical easy axis 70 oriented perpendicular to the magnetic flux conduction path in the pole piece. The angle of the desired magnetic flux conduction path of these pole pieces to the longitudinal axis is typically 15° to either side of the axis and the difference in orientation between easy axis 66 and 70 is correspondingly 150°.

Pole pieces 36b and 36d are disposed at an oblique angle to a lateral axis 65, which is perpendicular to the longitudinal axis 64, and have an easy axis 74 oriented perpendicular to the desired magnetic flux conduction path in the pole piece. Pole pieces 38b and 38d are similarly disposed at an oblique angle to the lateral axis 65 (opposite to that of pole pieces 36b and 36d) and also have an easy axis 78 oriented perpendicular to the magnetic flux conduction path in the pole piece. The angle of the desired magnetic flux conduction path of these pole pieces to the lateral axis 65 is typically 15° to either side of the axis and the difference in orientation between easy axis 74 and easy axis 70 is correspondingly 150°. As a result, magnetic flux F enters the yoke through tip 37 and flows perpendicular to easy axes 66, 78, 74, 70, 66, 78, 74, and 70 before leaving the yoke 32 through tip 39. Thus, the magnetic flux is conducted by rotation throughout the entire length of each pole piece of yoke 32. Furthermore magnetic flux conduction through the vias 50, 52, 54, 56, 58, 60 and 62 is highly efficient because the vias are disposed perpendicular (i.e., into the paper of FIG. 3) to the planes of the pole pieces.

Figure 5:
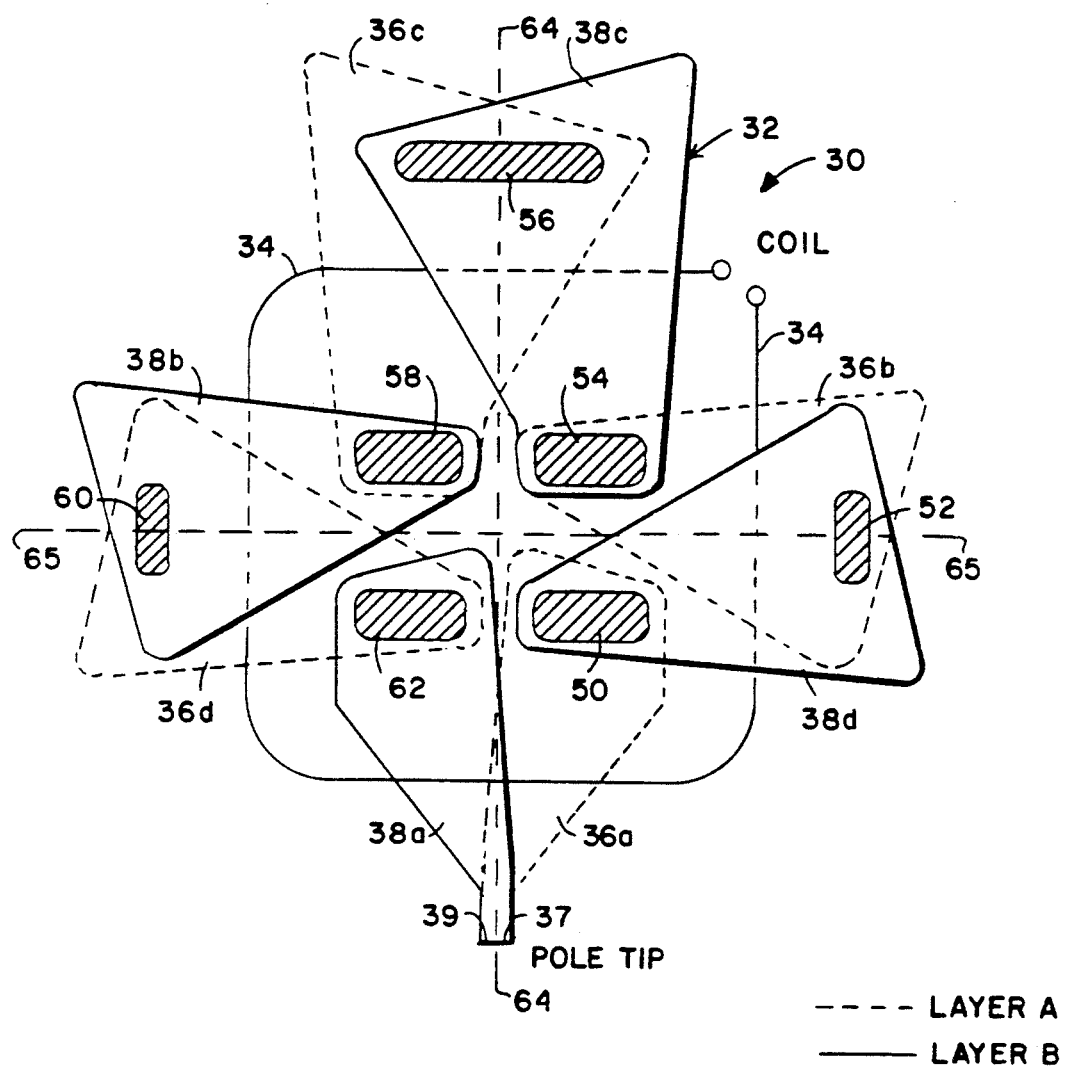
FIG. 5 is a top view of the thin film magnetic head of FIG. 3 showing typical pole piece shapes and configuration.

FIG. 5 shows a top view of an embodiment of a thin film magnetic head 30 of FIG. 3 showing a more typical shape for pole pieces 36a-36d and 38a-38d of yoke 32.

Figure 6B:
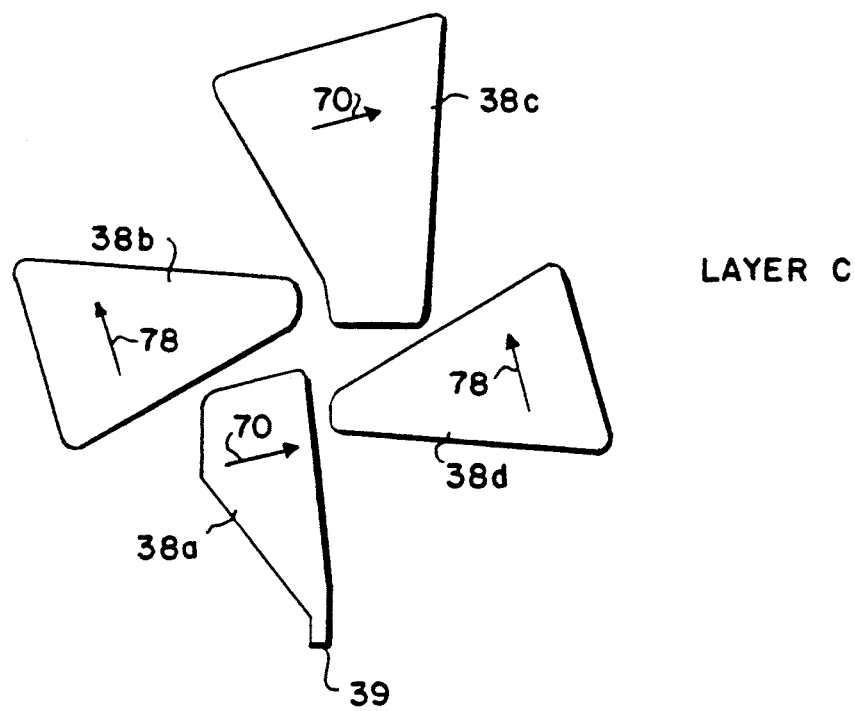
FIGS. 6A and 6B are top views of pole piece layers A and C, respectively, of the thin film magnetic head of FIG. 5 showing pole piece layout and easy axis orientation for each pole piece.
Figure 6A:
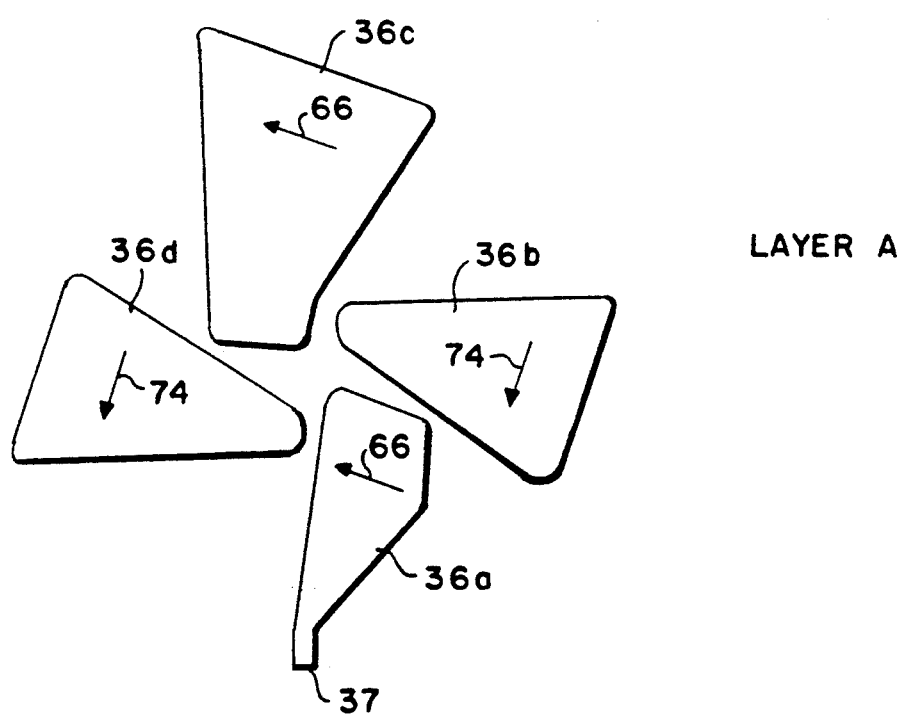

Thin film magnetic head 30 of FIG. 5 is disposed in three layers, layers A, B, and C, that are deposited sequentially during fabrication. FIGS. 6A and 6B show isolated views on layer A and layer C, respectively, of head 30 of FIG. 5. Pole pieces in each layer having the same easy axis orientation are deposited on an insulating layer at the same time in the presence of a magnetic field. Specifically, Layer A (FIG. 6A) is deposited first in a process which forms pole pieces 36a, 36c in the presence of one magnetic field to establish easy axis 66, and pole pieces 36b, 36d in the presence of a different magnetic field to establish easy axis 74.

After a thin layer of insulation (not shown) is placed over layer A, a copper layer is deposited to form coil 34 in layer B. Coil 34 includes numerous turns, but is shown with only one turn for clarity. In other preferred embodiments, coil 34 is a multiple layer coil, having an increased number of turns, formed from two or more layers of copper separated by insulation layers. Coil 34 is ultimately connected to processing circuitry (not shown), which drives coil 34 during writing and senses the signals produced in the coil by magnetic flux during reading.

Next, another thin layer of insulation, not shown, is deposited over coil 34. Then, layer C (FIG. 6B) is deposited last in a process which, similar to layer A, forms pole pieces 38a, 38c in the presence of one magnetic field to establish easy axis 70 and pole pieces 38b, 38d in the presence of a different magnetic field to establish easy axis 78.

As shown in FIG. 5, the pole pieces formed on layers A and C are connected together by forming interior (proximal) vias 50, 54, 58, and 62, and exterior (distal) vias 52, 56, and 60 between layers A and C, through layer B.

Figure 7:
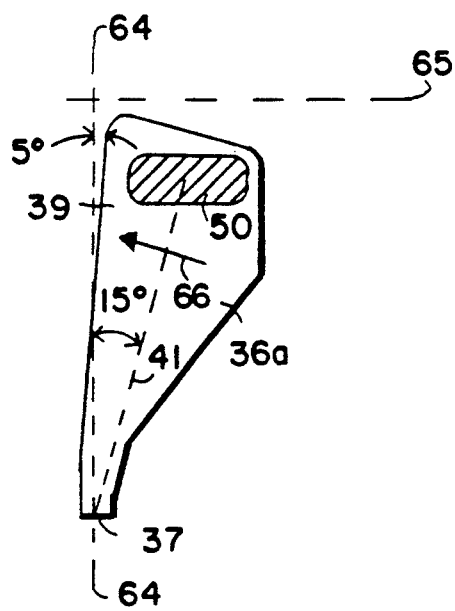
FIGS. 7, 8, and 9 show detailed top views of the geometry of the pole pieces of the thin film magnetic head of FIG. 5.

Pole piece 36a is shown in detail in FIG. 7. Along the length of pole piece 36a, the pole piece extends from narrow tip 37 to a somewhat broader region 39 at which via 50 is formed. One side of pole piece 36a (the right side in FIG. 7) extends substantially perpendicular from the base of tip 37 a short distance, but over the majority of its length the side forms a relatively large angle (e.g., 35°-45°) with longitudinal axis 64. The opposite side of pole piece 36a remains perpendicular to the base of tip 37 for a somewhat greater distance, and is then bent at a shallow angle (such as 5°) with respect to longitudinal axis 64.

Figure 2A:
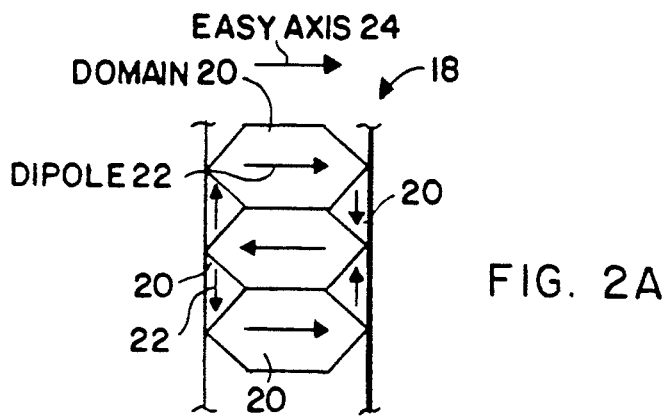
FIGS. 2A-2C illustrate the domain structure of a ferromagnetic material at rest (FIG. 2A), during magnetic flux conduction by wall motion (FIG. 2B), and during magnetic flux conduction by rotation (FIG. 2C).
Figure 2B:
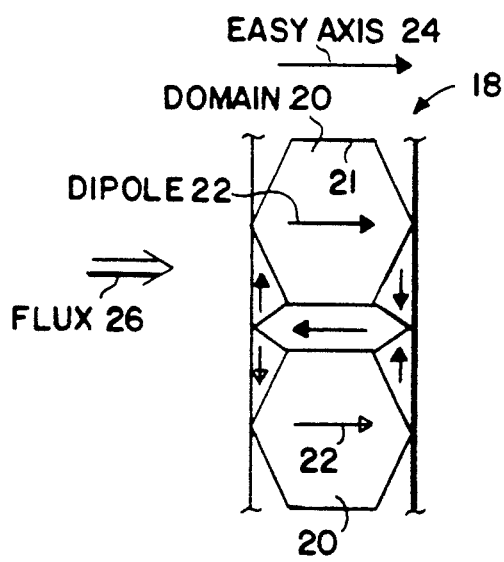
Figure 2C:
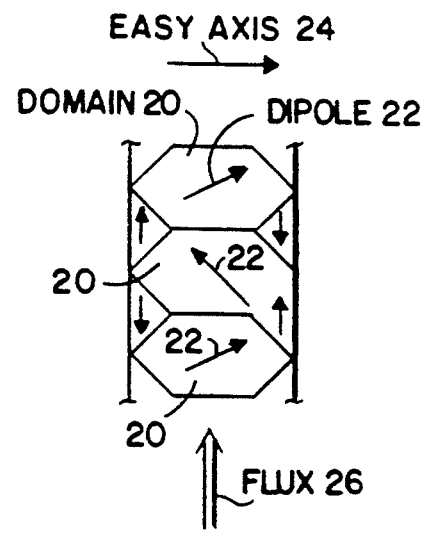

The resultant shape of pole piece 36a is such that a straight line 41 drawn from the center of the base of tip 37 to the center of via 50 forms an angle with longitudinal axis 64 that approximately equals the desired magnetic flux conduction angle of the pole piece (e.g., 15°) and that passes entirely through the center domains 20 (see FIG. 2A), rather than edge domains, of pole piece 36a. Easy axis 66, which represents the orientation of the magnetic dipoles in the center domains of pole piece 36a, is perpendicular to line 41, which represents the desired deviation of magnetic flux conduction in the pole piece. As a result, magnetic flux flowing into the center of tip 37 will conduct entirely by rotation along line 41, through the center domains, to via 50. Said another way, line 41 represents a "line-of-sight" path for the conduction of magnetic flux entirely by rotation from tip 37 to via 50, through which the magnetic flux is then conducted (again by rotation as described above) into the next pole piece 38d (FIG. 5). Although a small amount of magnetic flux that enters tip 37 near its edges will conduct by wall motion from the edge domains (see FIG. 2A) to a center domain before conducting by rotation along line 41 the overall effect of the wall motion conduction is minimal since the distance travelled by wall motion is very small compared to the overall length of the entire yoke 32.

Note that pole piece 38a (FIG. 5), which contains the other pole tip 39, is essentially the mirror image of pole piece 36a and thus provides a similar "line-of-sight" rotational magnetic flux conduction path between tip 39 and the respective via 62, which connects pole piece 38a with pole piece 36d.

Figure 8:
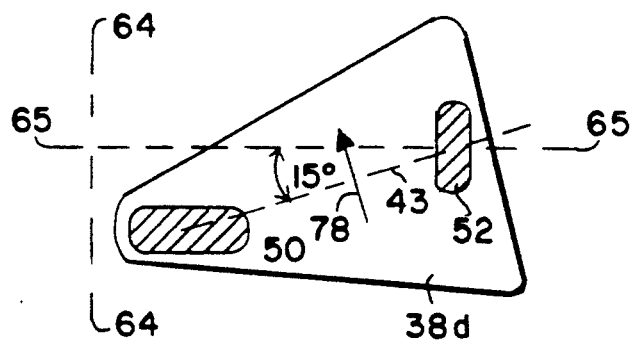

Pole piece 38d is shown in detail in FIG. 8. As illustrated, pole piece 38d extends from a narrow section at via 50, through which it is coupled to pole piece 36a, to the right to a somewhat broader region at which via 52 is formed. The resultant shape of pole piece 38d is such that a straight line 43 drawn from the center of via 50 to the center of via 52 forms an angle with lateral axis 65 that approximately equals the desired magnetic flux conduction angle of the pole piece (e.g., 15°) and that passes entirely through the center domains 20 (see FIG. 2A), rather than edge domains, of pole piece 38d. Easy axis 78, which represents the orientation of the magnetic dipoles in the center domains of pole piece 38d, is perpendicular to line 43 which represents the desired direction of magnetic flux conduction through the pole piece. As a result, magnetic flux flowing from pole piece 36a into the center of via 50 will conduct entirely by rotation along line 43 through the center domains to via 52, through which the magnetic flux is then conducted into the next pole piece 36b (FIG. 5). That is, line 43 represents a "line-of-sight" path for the conduction of flux entirely by rotation from via 50 to via 52 in pole piece 38d.

Note that pole pieces 36b, 36d and 38b (FIG. 5). are essentially mirror images of pole piece 38d. In particular pole piece 38b is a 180° rotated version of pole piece 38d, and pole piece 36b is a 180° rotated version of pole piece 36d. Thus each of these pole pieces provides a similar "line-of-sight" rotational magnetic flux conduction path between the vias which connect that pole piece to adjacent pole pieces.

Figure 9:
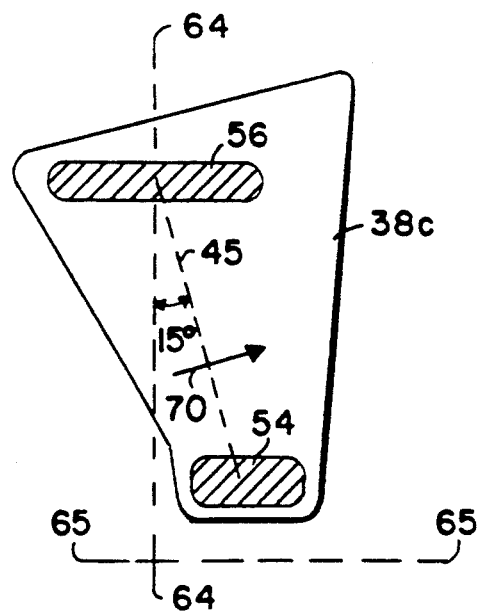

Pole piece 38c is shown in detail in FIG. 9. Pole piece 38c extends from a narrow section at via 54, through which it is coupled to pole piece 36b, to a somewhat broader region at which via 56 is formed. The resultant shape of pole piece 38c is such that a straight line 45 drawn from the center of via 54 to the center of via 56 forms an angle with longitudinal axis 64 that approximately equals the desired magnetic flux conduction angle of the pole piece (e.g., 15°) and that passes entirely through the center domains 20 (see FIG. 2A), rather than edge domains, of pole piece 38c. Easy axis 70, which represents the orientation of the magnetic dipoles in the center domains of pole piece 38c, is perpendicular to line 45 which represents the desired direction of magnetic flux conduction through the pole piece. As a result, magnetic flux flowing from pole piece 36b into the center of via 54 will conduct entirely by rotation along line 45, through the center domains, to via 56, through which the magnetic flux is conducted into the next pole piece 36c (FIG. 5). That is, line 45 represents a "line-of-sight" path for the conduction of magnetic flux entirely by rotation from via 54 to via 56 in pole piece 38c.

Note that pole piece 36c (FIG. 5) is essentially a mirror image of pole piece 38c. Thus pole piece 36c provides a similar "line-of-sight" rotational magnetic flux conduction path between the vias 56 and 58 which connect that pole piece between pole pieces 38b and 38c.

In operation, magnetic flux F that enters tip 37 from one pole of a di-bit of medium 40, for instance, is conducted by rotation down the length of pole piece 36a due to the perpendicular orientation of easy axis 66 to the direction of magnetic flux conduction (and the above-discussed "line-of-sight" magnetic flux path through the center domains). Magnetic flux F continues to conduct by rotation through via 50 to pole piece 38d. Magnetic flux F continues to conduct by rotation as it passes through pole piece 38d, because the magnetic flux remains perpendicular to easy axis 78 of the pole piece. Conduction by rotation continues as magnetic flux F sequentially conducts through vias and pole pieces 36b, 38c, 36c, 38b, 36d, and 38a, from which the magnetic flux passes out of tip 39 to the other pole of the di-bit of medium 40 to complete the magnetic circuit with the medium.

During the round-trip conduction of magnetic flux from one tip, through the pole pieces, to the other tip, magnetic flux F interacts with coil 34 four times, due to the intertwined configuration of the pole pieces and coil 34. The first interaction occurs as magnetic flux F passes from below coil 34 to above it as magnetic flux F conducts through via 50 from pole piece 36a to 38d. There magnetic flux F is directed from above coil 34 to below it as the magnetic flux passes through via 52 from pole piece 38d to 36b. The second interaction occurs as magnetic flux F passes from below coil 34 to above it as magnetic flux F conducts through via 54 from pole piece 36b to 38c. This process continues, with the third interaction being made by the magnetic flux conduction through via 58 from pole piece 36c to 38b, and the fourth and final interaction being induced by the flow of magnetic flux F through via 62 from pole piece 36d to 38a. As a result, the electrical signal induced in coil 34 during reading, and the level of magnetic flux generated in the yoke 32 during writing is increased by approximately a factor of four over heads constructed with only a single magnetic flux interaction per coil winding.

Flux Strap Embodiment

Figure 10:
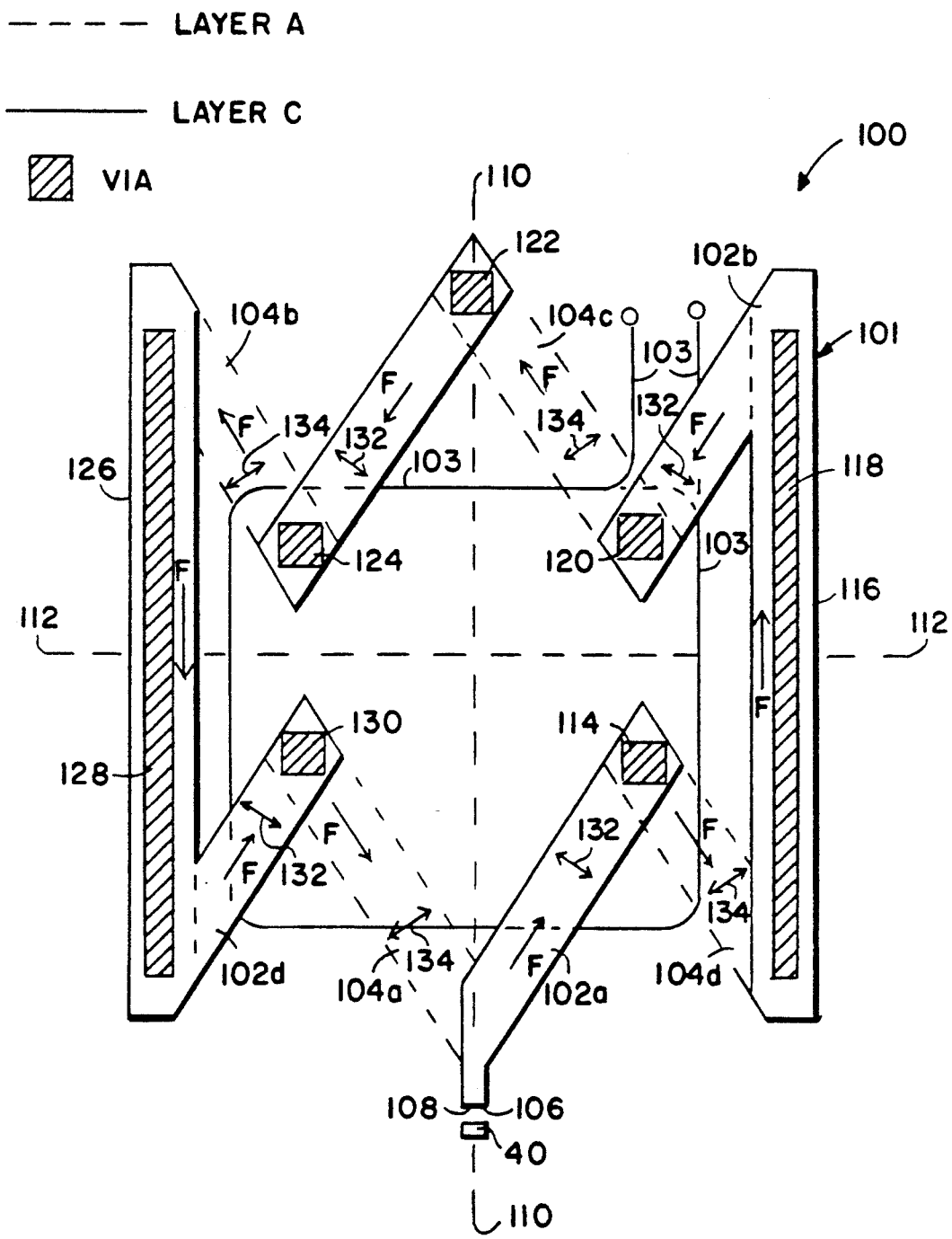
FIG. 10 is a schematic top view of another preferred embodiment of a thin film magnetic head of the present invention featuring "flux strap" conduction and four-fold relative signal increase over the magnetic head of FIG. 1.

FIG. 10 shows a schematic drawing of an alternative preferred embodiment of a thin film magnetic head 100 which includes a yoke 101 of ferromagnetic material (such as a nickel iron alloy) intertwined with a multi-turn planar coil 103 (only a single turn shown for simplicity). Head 100 also provides four magnetic flux interactions between yoke 101 and coil 103 and thereby significantly increases the inductive coupling therebetween as compared with conventional thin film magnetic heads (FIG. 1). Yoke 101 takes advantage of "flux strap" conduction of magnetic flux through a portion of the yoke 101 which allows for a yoke geometry requiring only a single easy axis orientation for all pole pieces deposited on any one thin film layer. This allows the thin film magnetic head 100 to be manufactured using standard thin film head manufacturing techniques. For instance, since all pole pieces are deposited on a layer at the same time and in the presence of the same magnetic field, that layer may be exposed to hard baking in the presence of a magnetic field to preserve the easy axis orientation of the pole pieces.

Specifically, yoke 101 is constructed from eight magnetic pole pieces 102a-102d and 104a-104d for conducting magnetic flux from the leading pole to the trailing pole of the head (see, e.g., FIGS. 4A and 4B). The pole pieces are woven around coil 103 so that magnetic flux in the pole pieces interacts with the coil four times as the magnetic flux is conducted through pole pieces 102a-102d and 104a-104d to or from magnetic storage medium 40.

Pole piece 102a-102d lie in a single thin-film layer, layer A, and pole pieces 104a-104d lie in a second thin-film layer, layer C. Coil 103 lies in a third thin-film layer B disposed between layers A and C. Layer B also serves as a transition layer to magnetically separate pole pieces 102a-102d from pole pieces 104a-104d. One end of pole piece 102a and one end of pole piece 104a are disposed adjacent to storage medium 40 and serve respectively as pole tips 106 and 108 for magnetically coupling the yoke 101 to the storage medium 40. Tips 106 and 108 are spaced by a gap (not shown) having a predetermined thickness to optimize the linear density of recording on the medium.

Pole pieces 102a-102d are alternately connected end-to-end with pole pieces 104d-104a to form the yoke 101. Specifically, the end of pole piece 102a, opposite tip end 106, is connected to one end of pole piece 104d through a via 114 traversing coil layer B. Via 114 provides a magnetic flux conduction path from pole piece 102a to pole piece 104d through an area of Layer B that is interior to the area perimeter formed by coil 103 to provide the first of four magnetic flux interactions with the coil.

The other end of pole piece 104d substantially overlaps one end of pole piece 102b along an edge 116 which is substantially parallel to the longitudinal axis 110 of the head. Pole pieces 104d and 102b are magnetically coupled together through an elongated via 118 which traverses the layer B area exterior to coil 103 and provides a "flux strap" for conducting magnetic flux parallel to the longitudinal axis 110, as described below. The other end of pole piece 102b is connected to one end of pole piece 104c through a via 120 which passes through layer B interior to coil 103 to provide the second magnetic flux interaction with the coil. The remaining pole pieces are similarly connected end-to-end so that via 122 traverses layer B external to the coil, and vias 124 and 130 traverse layer B interior to the coil to provide the third and fourth magnetic flux interactions. Furthermore, similar to pole pieces 102b and 104d, pole piece 102d substantially overlaps pole piece 104b along an edge 126 parallel to the longitudinal axis 110. Pole pieces 102d and 104b are magnetically coupled together through an elongated via 128 which traverses layer B exterior to coil 103 and provides a second "flux strap" for conducting magnetic flux parallel to the longitudinal axis 110, as described below.

The placing of the vias so that they alternately traverse layer B exterior to or interior to the coil 103 has the effect of wrapping the pole pieces of yoke 101 around the coil which increases the number of magnetic flux interactions between the coil and the yoke, in this case providing four such interactions. It is understood that any number of interactions may be similarly provided.

In operation, and similar to the embodiment of FIG. 3, the electrical signal induced in coil 103 by the passage of magnetic flux through pole piece pair (104a,102d) adds to the electrical signal generated in coil 103 by the conduction of the same magnetic flux through pole piece pairs (104b,102c), (104c,102b), and (104d,102a) resulting in a four-fold increased signal relative to a head in which the magnetic flux passes through the coil only once.

As discussed above, magnetic flux conducts more easily by rotation than by domain wall movement. The thin film magnetic head 100 of FIG. 10 is constructed to reduce the contribution of conduction by wall motion by orienting the magnetic easy axis of each pole piece substantially perpendicular to the desired direction of magnetic flux conduction in the pole piece, and by providing the "flux strap" vias 116 and 128 for conducting magnetic flux in a direction not perpendicular to the easy axis of either pole piece connected by the via.

Each ferromagnetic pole piece 102a-102d and 104a-104d is formed in the presence of a magnetic field to have an easy axis that is in the plane of the pole piece and canted at a predetermined angle with respect to the lateral axis 112 of the head 100 (which is perpendicular to longitudinal axis 110) to facilitate magnetic flux conduction through the pole piece.

Specifically, pole pieces 102a-102d are formed in layer C with identical easy axes 132 oriented substantially perpendicular to the desired magnetic flux conduction path F in the pole piece. In the preferred embodiment, easy axis 132 is oriented at a $-35°$ angle relative to the lateral axis 112. Pole pieces 104a-104d are formed in layer A with identical easy axes 134 oriented substantially perpendicular to the magnetic flux conduction F path in the pole piece. In the preferred embodiment, easy axis 134 is oriented at a $+35°$ angle relative to the lateral axis 112. Thus, the angle of enhanced magnetic flux conduction through pole pieces 102a-102d is $+55°$ relative to the lateral axis 112, and the angle of enhance magnetic flux conduction through pole pieces 104a-104d is $-55°$ relative to the lateral axis 112. Furthermore, easy axes 132 and 134 cross each other in "flux strap" vias 118 and 128 at an angle of approximately 110° relative to each other.

Figure 11:
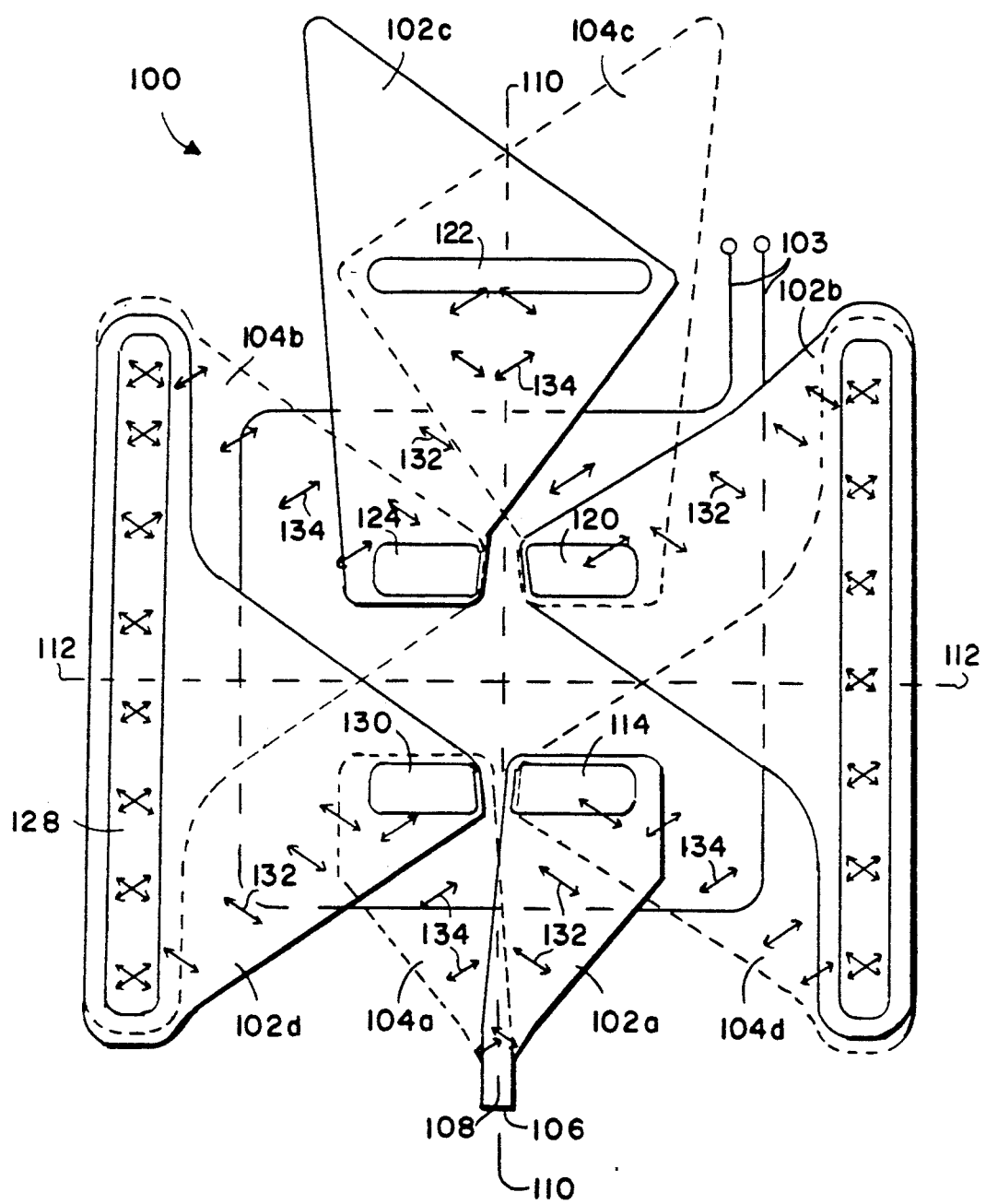
FIG. 11 is a top view of the thin film magnetic head of FIG. 10 showing typical pole piece shapes and configuration.
Figure 12B:
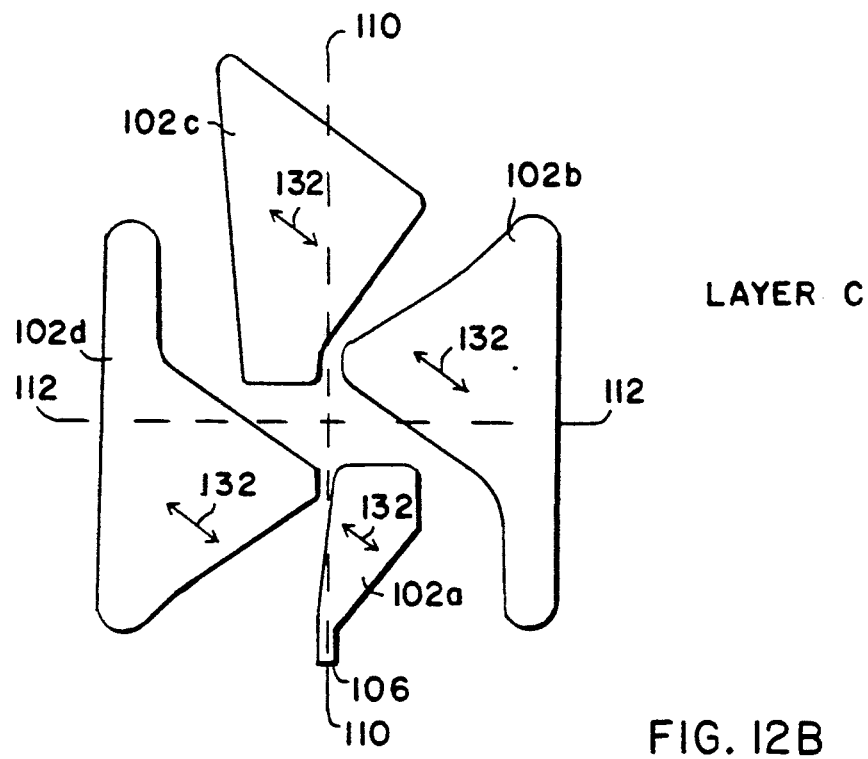
FIGS. 12A and 12B are top views of pole piece layers A and C, respectively, of the thin film magnetic head of FIG. 10 showing pole piece layout and easy axis orientation for each pole piece layer.
Figure 12A:
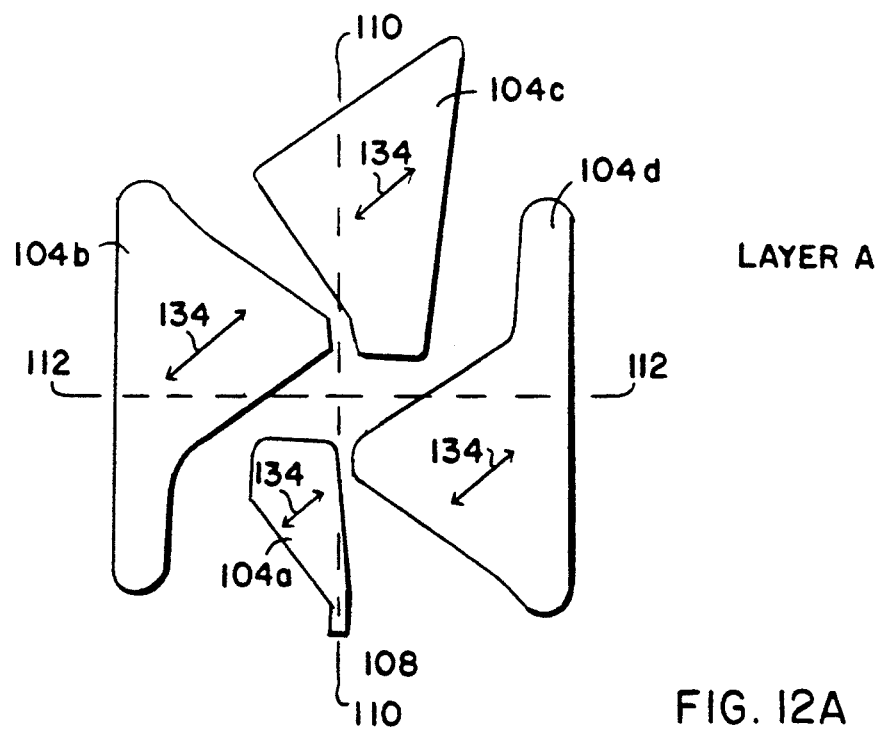

FIG. 11 shows a top view of the thin film magnetic head 100 embodiment of FIG. 10 showing a more typical shape for pole pieces 102a-102d and 104a-104d. Similar to thin film magnetic head 30 of FIG. 5, thin film magnetic head 100 is disposed in three layers, layers A, B, and C, that are deposited sequentially during fabrication. FIGS. 12A and 12B show isolated views of layer A and layer C, respectively, of head 100. All the pole pieces in the same layer have the same easy axis orientation and are deposited on an insulating layer at the same time in the presence of a magnetic field. Specifically, Layer A (FIG. 12A) is deposited first in a process which simultaneously forms pole pieces 104a-104d in the presence of a magnetic field oriented at a $+35°$ angle to lateral axis 112 to establish easy axes 134 in each'pole piece.

After a thin layer of insulation (not shown) is placed over layer A, a copper layer is deposited and etched to form coil 103 in layer B (FIG. 11). Coil 103 includes numerous turns, but is shown with only one turn for clarity. Coil 103 is connected to processing circuitry (not shown), which drives coil 34 during writing and senses the signals produced in the coil by magnetic flux during reading.

Another thin layer of insulation (not shown) is then deposited over coil 103. Then, layer C (FIG. 12B) is deposited last in a process which, similar to layer A, forms pole piece pairs 102a-102d in the presence of a magnetic field oriented at a −35° angle relative to the lateral axis 112 to establish easy axes 132 in each pole piece.

The pole pieces formed on layers A and C are connected together through layer B by forming interior vias 114, 120, 124, and 130 which pass through the Layer B area interior to coil 103, and exterior via 122, and elongated exterior vias, or "flux straps" 118 and 128 which pass through Layer B area exterior to coil 103.

Figure 13:
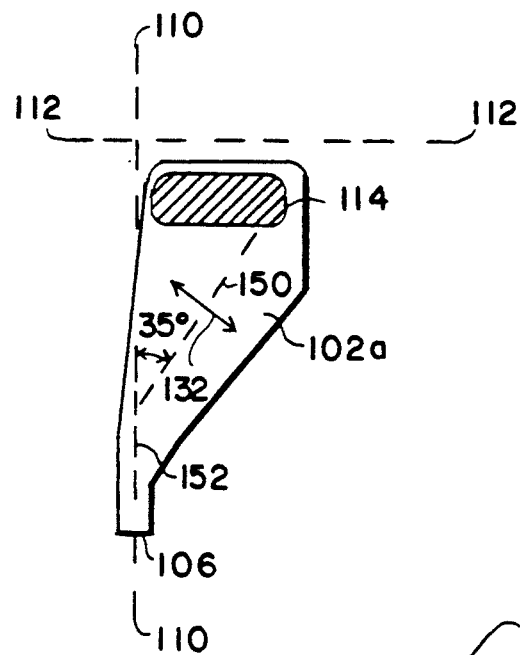
FIG. 13 shows a detailed top view of the geometry of a pole piece of the thin film magnetic head of FIG. 10.

Pole piece 102a is shown in detail in FIG. 13. Pole piece 102a extends from narrow tip 106 to a somewhat broader region at which via 114 is formed. One side of pole piece 102a (the right side in FIG. 13) extends substantially perpendicular from the base of tip 106 a short distance, but over the majority of its length the side forms a relatively large angle (e.g., 45°) with longitudinal axis 110. The opposite side of pole piece 102a remains perpendicular to the base or edge of tip 106 for a somewhat greater distance, and is then bent at a shallow angle (such as 5°) with respect to longitudinal axis 110.

The resultant shape of pole piece 102a is such that a straight line 150 drawn from the right side of via 114 at a 35° angle to the longitudinal axis 110, i.e., perpendicular to easy axis 132, intersects longitudinal axis 110 at a point 152. Line 150 represents the magnetic flux conduction path perpendicular to easy axis 132 which passes substantially through the center domains 20 (see FIG. 2A), rather than edge domains, of pole piece 102a. As a result, magnetic flux flowing into the center of tip 106 will conduct a short distance along the longitudinal axis from the tip to point 152 by a combination of rotation and wall motion, and then will conduct entirely by rotation through the center domains along line 150 from point 152 to via 114. Although the magnetic flux that enters tip 106 will conduct by combined wall motion and rotation from the tip to point 152 before conducting by rotation along line 150, the overall effect of the wall motion conduction is small due to substantial magnetic flux spreading at low frequencies.

Note that pole piece 104a (FIG. 11), which contains the other pole tip 108, is essentially the mirror image of pole piece 102a and thus provides a similar magnetic flux conduction path between tip 108 and the via 130 that connects pole piece 104a with pole piece 102d.

Figure 14:
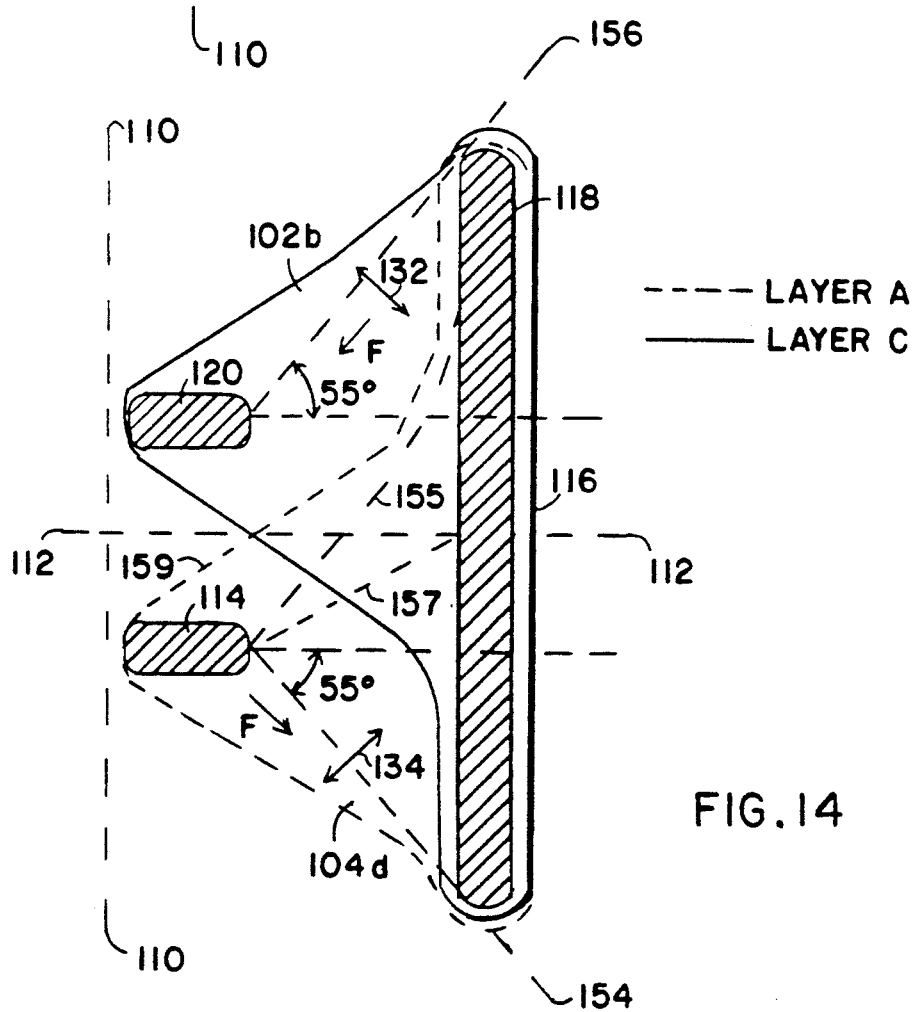
FIG. 14 shows a detailed top view of the geometry of the "flux strap" of the thin film magnetic head of FIG. 10.

Pole piece 104d and 102b are shown in detail in FIG. 14. Pole piece 104d extends from a narrow section at via 114, through which it is coupled to pole piece 102a, to the right to a broader region having an elongated edge 116 substantially parallel to longitudinal axis 110 along which "flux strap" via 118 is formed. Pole piece 102b is a mirror image of pole piece 104d, extending from a narrow section at via 120, through which it is coupled to pole piece 104c, to the right to an elongated broad region overlapping a substantial portion of pole piece 104d.

The resultant shape of pole piece 104d is such that a straight line 154 drawn from the right end of via 114 to the bottom end of "flux strap" via 118 is substantially perpendicular to easy axis 134, i.e., forms an approximate −55° angle with lateral axis 112, and passes substantially through center domains 20 (see FIG. 2A), rather than edge domains, of pole piece 104d. An edge 159 of pole piece 104d is substantially parallel to easy axis 134, which helps to maintain the easy axis 134 direction in the pole piece. High frequency magnetic flux flowing from pole piece 102a into via 114 will conduct substantially by rotation along line 154, through the center domains, to the bottom end of "flux strap" via 118, through which it is conducted to pole piece 102b. Furthermore, the shape of pole piece 102b is such that a straight line 156 drawn from the right end of via 120 to the top end of "flux strap" via 118 is substantially perpendicular to easy axis 132, i,e., forms an approximate +55° angle with lateral axis 112, and passes substantially through center domains 20 (see FIG. 2A), rather than edge domains, of pole piece 102b. As a result, high frequency magnetic flux flowing out of the top end of "flux strap" via 118 from pole piece 104d will conduct entirely by rotation along line 156, through the center domains, and to the left side via 120, through which it is conducted to hole piece 104c.

Head 100 of FIG. 11 performs better at low frequencies (e.g., <20 MHz) than at high frequencies for the reasons described below. Low frequency thin film magnetic heads are favored for use in low form factor magnetic disk drives (e.g., <2") where low linear disk velocity produces low frequency signals. The efficiency of head 100 at low frequencies is similar to that of head 30 of FIG. 3, but without extra processing steps required to deposit pole pieces having different easy axes on the same layer. Thus, head 100 of FIG. 10 provides a cost effective magnetic head for low frequency applications which can be manufactured with standard processes, has a high degree of symmetry, and fits on a relatively narrow railwidth, e.g., a conventional slicker mechanism.

Due to the geometry of pole pieces 104d, 102b, 104b, and 102d, the magnetic flux conduction paths through these pole pieces (e.g., along line 154 of pole piece 104d, through "flux strap" 118, and along line 156 of pole piece 102b of FIG. 14) create a relatively long flux conduction path through the entire yoke 101. That is, the magnetic flux conduction path shown in FIG. 10 for yoke 101 is relatively longer than that for yoke 32 of FIG. 3. Specifically the flux conduction paths through pole pieces 104d, 102b, 104b, and 102d of yoke 101 of FIG. 10, are relatively longer than the corresponding paths through pole pieces 38d, 36b, 38b, and 36d of yoke 72 of FIG. 3.

The additional flux conduction path length through yoke 101 reduces the high frequency magnetic flux conduction efficiency of the yoke relative to the efficiency of yoke 32 of FIG. 3. However, at low frequencies (e.g., <20 MHz), the effective flux conduction path length of yoke 101 of FIG. 10 approaches that of yoke 32 of FIG. 3 for low frequencies. This happens since magnetic flux conduction at low frequencies occurs primarily through magnetic flux spreading, which is not confined to the magnetic flux conduction paths perpendicular to the pole piece easy axes. The alignment of the easy axis in each of these pole pieces, however, provide for efficient low frequency magnetic flux conduction across the surface of the pole piece through flux spreading. Magnetic flux conduction by flux spreading is described by M. Mallary, et al., "Conduction of Flux at High Frequencies by a Charge-Free Magnetization Distribution" IEEE Transactions on Magnetics, Vol. 24, No. 6, Nov. 1988, which is incorporated herein by reference.

Therefore, low frequency magnetic flux conduction occurs across a large portion of the surface of pole pieces 104d, 102b, 104b, and 102d. For instance, with reference to FIG. 14, low frequency magnetic flux entering pole piece 104d through via 114 will spread across the surface of pole piece 104d and impinge on "flux strap" 118 along nearly its entire length, i.e., "flux strap" 118 effectively accumulates the low frequency magnetic flux conducted across the surface of pole piece 104d. The low frequency magnetic flux conducted in pole piece 104d spreads from via 114 across the surface of the pole piece toward "flux strap" 118, bounded generally by line 154 and boundary 155. On average, the low frequency flux conduction path can be considered to be along line 157 which goes from via 114 to the midpoint along the length of "flux strap" 118. This average low frequency magnetic flux conduction path along line 157 is substantially equivalent in length to the magnetic flux conduction path traversed along line 43 of pole piece 38d of FIG. 8. Note that pole pieces 104b and 102d (FIG. 11) are essentially mirror images of pole pieces 102b and 104d, respectively, and behave similarly with regard to the low frequency flux conduction path through that pole piece. Thus each of these pole pieces provides a similar magnetic flux conduction path between the vias which connect that pole piece to other pole pieces and common "flux strap" via 128.

Although "flux straps" 118 and 128 are vias, they act as a laminated thin film having two layers of differently oriented easy axes of magnetization in which magnetic flux conduction by rotation can be enhanced. The use of laminated layers in a thin film head is the subject of U.S. Pat. No. 5,089,334, issued Feb. 18, 1992, to Mallary et al., entitled "Flux Spreading Thin Film Magnetic Devices". That application is assigned to the same assignee as this application and is incorporated herein by reference.

In operation, magnetic flux conducts more easily by rotation than by domain wall movement. Stated another way, conduction by domain wall motion presents a higher impedance to the conduction of magnetic flux than does conduction by rotation. Referring again to FIG. 14, as magnetic flux F approaches the bottom end of "flux strap" 118 along line 154 it conducts substantially by rotation in pole piece 104d and thus all of the magnetic flux remains in layer A at the bottom end of "flux strap" 118. When the magnetic flux enters "flux strap" 118, it is perpendicular to neither easy axis 134 (pole piece 104d) nor easy axis 132 (pole piece 102b) and thus cannot conduct along the length of the "flux strap" purely by rotation in either layer A or layer C. However, because of the domain structure of layers A and C, the magnetic flux can conduct by rotation perpendicular to the easy axis of each layer for a short distance before the domain structure of the layer requires the magnetic flux to conduct by wall motion. At this point, the magnetic flux is able to conduct by rotation perpendicular to the easy axis of the adjacent layer and as a result the magnetic flux jumps to the adjacent layer so that it can travel through the path of least impedance. The magnetic flux continues to jump back and forth between layers A and C along the length of "flux strap" 118 until it reaches the top end region of the "flux strap" that is oriented perpendicular to easy axis 132 of pole piece 102b. At this point, the magnetic flux can conduct substantially by rotation in layer C alone, and thus the magnetic flux enters pole piece 102b and remains in layer C as it conducts along line 156 toward via 120.

Ideally, easy axis 132 is oriented perpendicular to easy axis 134, but these axes can alternatively be disposed at a relative angle somewhat different from 90° with good results. In this case, easy axis 132 crosses easy axis 134 at a relative angle of 110°, which is sufficiently close to perpendicular to achieve good magnetic flux conduction along the length of the "flux strap".

Pole pieces 104c and 102c are similar in shape and function as pole pieces 38c and 36c of FIG. 5. Details of pole pieces 104c and 102 are thus similar to that discussed with reference to FIG. 9.

Manufacturing Considerations

Figure 15D:
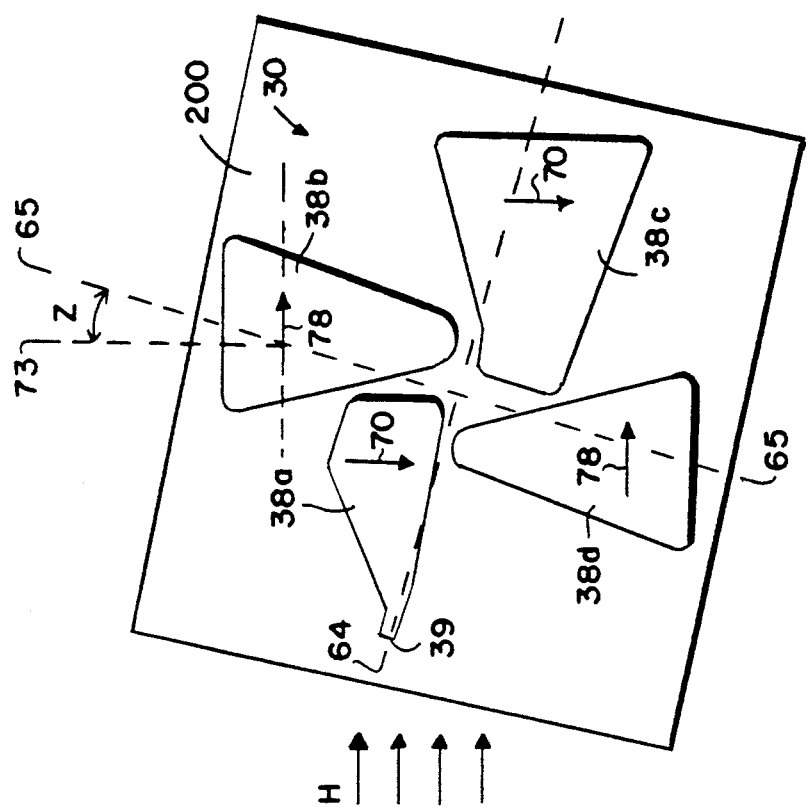

FIGS. 15A–15D show manufacturing operations which can be used for producing the thin film magnetic head 30 of FIG. 5. The pole pieces of head 30 (and also head 100 of FIG. 11) are preferably manufactured by depositing NiFe in the presence of a magnetic field. Referring to FIG. 15A, pole pieces 36a and 36c of head 30 are deposited first on a substrate 200 (such as a wafer) in the presence of a magnetic field H that is applied horizontally to layer A and perpendicular to the desired direction of magnetic flux conduction in the pole pieces to induce an easy axis of magnetic flux conduction 66 in each pole piece. To prepare for the deposition of yoke pole pieces 36a and 36c, substrate 200 is attached to a mount (not shown) so that head longitudinal axis 64 is oriented at the desired angle of cant W (in this example, −15°) with respect to the normal direction 67 to easy axis 66. Then, pole pieces 36a and 36c (and their associated seed layers, not shown) are deposited onto layer A while magnetic field H is applied. Note that the direction of magnetic field H is parallel to the easy axis 66 of pole pieces 36a and 36c.

Referring to FIG. 15B, substrate 200 is next reoriented relative to magnetic field H, and pole pieces 36b and 36d (and their associated seed layers, not shown) are deposited onto layer A while magnetic field H is applied. Specifically, substrate 200 is reoriented so that head lateral axis 65 is oriented at the desired angle of cant X (in this example, −15°) with respect to the normal direction 69 to easy axis 74. Note that the direction of magnetic field H is parallel to the easy axis 74 of pole pieces 36b and 36d. Thus, layer A is deposited with pole pieces 36a and 36c having one easy axis direction 66, and pole pieces 36b and 36d having another easy axis direction 74.

Next, one or more layers of photoresist (not shown) are applied over pole pieces 36a–36d and hard baked to form a layer of electrical insulation over which one or more layers of windings (formed by photoetching copper) of coil 63 (not shown) are deposited in layer B. An additional layer or layers of photoresist are applied over coil 63 (not shown) and also hard baked.

The hard baking steps are typically performed at between 225° and 265° Centigrade, preferably between 225° and 265° Centigrade, and most preferably at 260° Centigrade. Temperatures below 225° Centigrade may not be sufficient to cause the insulating layers to harden sufficiently, while exposing pole pieces 36a–36d to temperatures above 265° Centigrade may severely degrade the magnetic properties of the pole pieces. However, exposing pole pieces 36a–36d to 225°–265° Centigrade hard baking temperatures causes an approximate 5° reduction in the angles of easy axes 66 and 74 of pole pieces 36a, 36c, and 36b, 36d, respectively. For example, cant angle W of FIG. 15A and cant angle X of FIG. 15B are each reduced to about −10°. These reductions can be compensated for by forming the pole pieces 36a and 36c to have an initial cant angle W of −20° and pole pieces 36b and 36d to have an initial cant angle X of −20°. Thus after hard baking, cant angles W and X will each be approximately −15°.

Figure 15C:
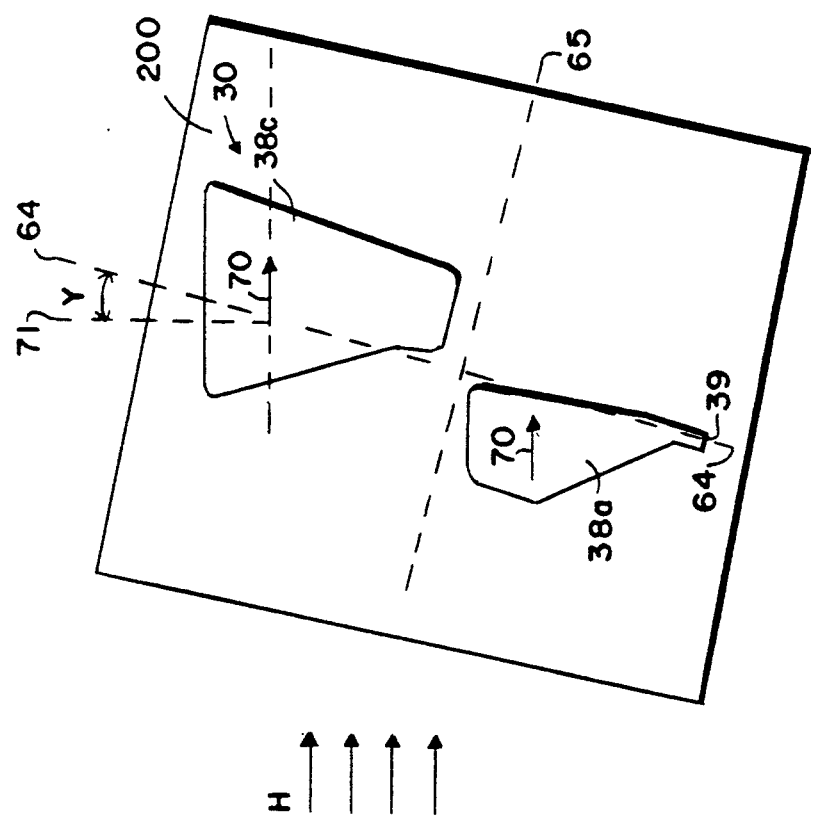

Referring to FIG. 15C, pole pieces 38a and 38c are next formed in the uppermost layer, layer C, of head 30 as follows. Substrate 200 is reoriented so that head longitudinal axis 64 is oriented at the desired angle of cant Y (in this example, +15°) with respect to the normal direction 71 to easy axis 70. Then, pole pieces 38a and 38c (and their associated seed layers, not shown) are deposited onto layer C while magnetic field H is applied. Note that the direction of magnetic field H is parallel to the easy axis 70 of pole pieces 38a and 38c.

Referring to FIG. 15D, substrate 200 is next reoriented relative to magnetic field H, and pole pieces 38b and 38d (and their associated seed layers, not shown) are deposited onto layer C while magnetic field H is applied. Specifically, substrate 200 is reoriented so that head lateral axis 65 is oriented at the desired angle of cant Z (in this example, +15°) with respect to the normal direction 73 to easy axis 78. Note that the direction of magnetic field H is parallel to the easy axis 78 of pole pieces 38b and 38d. Since no hard baking step is require after depositing pole pieces 38a-38d on layer C, no reduction of the easy axes of these pole pieces occurs and no compensation is required as with pole pieces 36a-36d. Thus, layer C is deposited with pole pieces 38a and 38c having one easy axis direction 70, and pole pieces 38b and 38d having another easy axis direction 78. In total, head 30 has pole pieces having easy axes oriented in four different directions.

Pole pieces 36a-36d and 38a-38d are then interconnected by vias formed through holes in the insulating layers to form a complete magnetic flux path between tips 37 and 39 (FIG. 5).

Figure 16B:
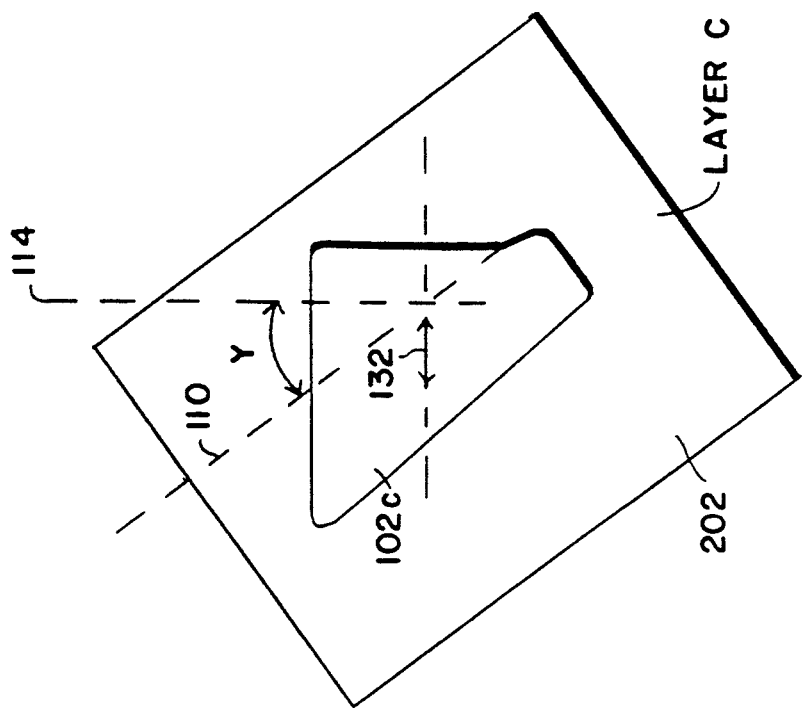
FIGS. 16A and 16B illustrate the fabrication of the thin film magnetic head of FIG. 11.
Figure 16A:
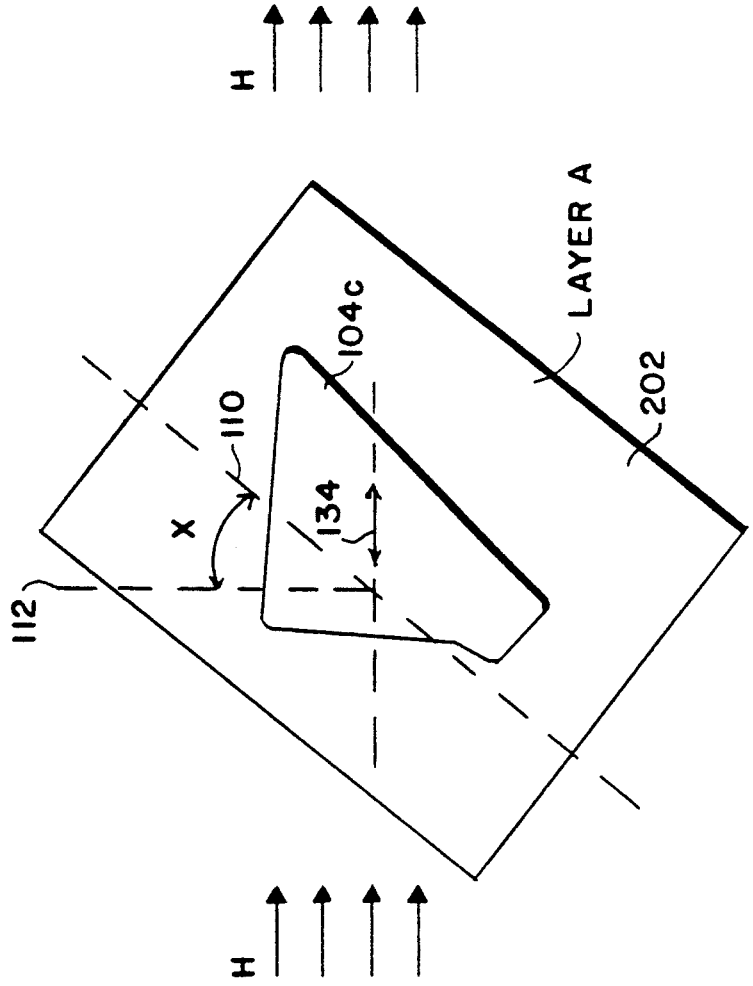

FIGS. 16A and 16B show manufacturing operations which can be use& for producing the thin film magnetic head 100 of FIG. 11. Referring to FIG. 16A, pole pieces 104a-104d of head 100 (only pole piece 104c is shown for simplicity) are deposited on a substrate 202 (such as a wafer) in the presence of a magnetic field H that is applied horizontally to layer A and perpendicular to the desired direction of magnetic flux conduction in the pole pieces to induce an easy axis of magnetic flux conduction 134 in each pole piece 104a-104d. To prepare for the deposition of yoke pole pieces 104a-104d, substrate 202 is attached to a mount (not shown) so that head longitudinal axis 110 is oriented at the desired angle of cant X (in this example, +35°) with respect to the normal direction 112 to easy axis 134. Then, pole pieces 104a-104d (and their associated seed layers, not shown) are deposited while magnetic field H is applied. Note that the direction of field H is parallel to the easy axis 134 of pole pieces 104a-104d.

Next, one or more layers of photoresist (not shown) are applied over pole pieces 104a-104d and hard baked, as described above, to form a layer of electrical insulation over which one or more layers of windings (formed by photoetching copper) of coil 103 (not shown) are deposited in layer B. An additional layer or layers of photoresist are applied over coil 103 (not shown) and also hard baked. During the hard baking steps, magnetic field M is applied in a direction parallel to easy axis 134 which prevents reduction of the easy axis angle otherwise caused by hard baking.

Then, the remaining pole pieces 102a-102d (only pole piece 102c is shown) are formed in the uppermost layer, layer C. Pole pieces 102a-102d are oriented so that the normal direction 114 to easy axis 132 is disposed at an opposite oblique angle Y to axis 110 from pole pieces 104a-104d (i.e., at an angle of −35°). As shown in FIG. 15 for pole piece 102c, before pole pieces 104a-104d are deposited, substrate 200 is rotated in the mounting device to orient wafer axis 110 at the selected cant angle Y (in this example, +35° degrees) with respect to the direction 114. During deposition, magnetic field H is applied parallel to easy axis 132 to induce an easy axis 132 in each pole piece that is perpendicular to the desired direction of magnetic flux conduction in the pole piece.

Pole pieces 104a-104d and 102a-102d are then interconnected by vias formed through holes in the insulating layers to form a complete magnetic flux path between tips 106 and 108 (FIG. 11).

While this invention has been particularly shown and described with reference to preferred embodiments thereof, it will be understood by those skilled in the art that various changes in form and details may be made therein without departing from the spirit and scope of the invention as defined by the appended claims. For example, the pole pieces and easy axes may be oriented at angles other than those described, according to the pole configuration desired for a given application. For example, the easy axis can be induced in other ways other than by depositing or annealing the pole pieces in the presence of a magnetic field. For example, the easy axis can be formed by the so-called "angle of incidence" method in which the ferromagnetic material is deposited at a glancing angle to induce the easy axis at the angle of deposit. Alternatively, the easy axis can be produced by a combined selection of the magnetostrictive properties of the material, the stress fields induced in the material during deposition, and the geometry of the pole. Ferromagnetic materials other than NiFe, for example, nickel-iron alloys such as NiFeCo, can be used. Other temperatures can be employed during hard baking steps.

We claim:

1. A thin film magnetic transducer formed of a film having a plurality of layers and comprising:

a yoke having a plurality of magnetic flux circuits disposed about the center of the transducer such that there exists for each magnetic flux circuit two terminal end portions for coupling magnetic flux into and out of each magnetic flux circuit, each magnetic flux circuit having a first pole piece disposed in one layer of the film coupled at a corresponding distal via to a second pole piece disposed in another layer of the film, said distal via traversing the layers of the film and disposed on a portion of the magnetic flux circuit distal to the terminal end portions relative to the center of the transducer, each terminal end portion of each magnetic flux circuit being magnetically coupled to a corresponding terminal end portion of an adjacent magnetic flux circuit through a corresponding proximal via traversing the layers of the film and disposed proximal to the center of the transducer, each pole piece having an easy axis of magnetization oriented substantially perpendicular to a flux conduction path therein lying among a line of sight between the centers of the corresponding distal and proximal vias at opposite ends thereof, and wherein the line of sight in the first pole piece and the line of sight in the second pole piece intersect at the distal via coupling the first and second pole pieces, said magnetic flux circuits being disposed such that there are at least two pole pieces in each of said layers having non-parallel easy axes;

a first tip pole piece having a pole tip and disposed in said one layer of the film, said first tip pole piece having one end adapted for positioning adjacent to a magnetic medium for coupling magnetic flux between the medium and the yoke, and having its other end magnetically coupled to a corresponding terminal end portion of an adjacent magnetic flux circuit through a corresponding proximal via;

a second tip pole piece having a pole tip and disposed in said other layer of the film, said second tip pole piece having one end adapted for positioning adjacent to the magnetic medium for coupling magnetic flux between the medium and the yoke, and having its other end magnetically coupled to a corresponding terminal end portion of an adjacent magnetic flux circuit through a corresponding proximal via; and a coil having a plurality of turns intertwined with the yoke and passing between the distal and proximal vias, so that the distal vias are exterior to the coil and the proximal vias are interior to the coil, to provide at least four magnetic flux interactions between the coil and the yoke.

2. The thin film magnetic head of claim 1 wherein a plurality of the pole pieces have an easy axis forming an oblique angle of substantially 15° with the longitudinal axis f the transducer.

3. The thin film magnetic head of claim 1 wherein a plurality of the pole pieces have an easy axis forming an oblique angle of substantially 15° with the lateral axis of the transducer.

4. The thin film magnetic head of claim 1 wherein
a plurality of the pole pieces have an easy axis forming an oblique angle of substantially 15° with the longitudinal axis of the transducer, and
another plurality of the pole pieces have an easy axis forming an oblique angle of substantially 15° with the lateral axis of the transducer.

5. The thin film magnetic head of claim 4 wherein the easy axes of two pole pieces connected together by a distal via differ by substantially 30° relative to each other, and the easy axes of two pole pieces connected together by a proximal via differ by substantially 120° relative to each other.

6. A method for making a thin film magnetic transducer from a film having a plurality of layers, comprising the steps of:

forming a yoke having a plurality of magnetic flux circuits disposed about the center of the transducer such that there exists for each magnetic flux circuit two terminal end portions for coupling magnetic flux into and out of each magnetic flux circuit, each magnetic flux circuit being formed with a first pole piece in one layer of the film and a second pole piece in another layer of the film, forming the yoke comprising the steps of:

connecting the first and second pole pieces of each magnetic flux circuit together through a corresponding distal via traversing the layers of the film and disposed on a portion of the magnetic flux circuit distal to the terminal end portions relative to the center of the transducer;

connecting the terminal end portion of each magnetic flux circuit to a corresponding terminal end of an adjacent magnetic flux circuit through a corresponding proximal via traversing the layers of the film and disposed proximal to the center of the transducer; and forming said pole pieces such that the easy axis of magnetization of each pole piece is oriented substantially perpendicular to a flux conduction path therein lying along a line of sight between the centers of the corresponding distal and proximal vias at opposite ends thereof, and such that the line of sight in the first pole piece and the line of sight in the second pole piece intersect at the distal via connecting the first and second pole pieces, said magnetic flux circuits being formed such that there are at least two pole pieces in each of said layers having non-parallel easy axes;

forming a first tip pole piece having a pole tip in said one layer of the film such that one end of said first tip pole piece is adapted for positioning adjacent to a magnetic medium for coupling magnetic flux between the medium and the yoke, and such that the other end of the first tip pole piece is connected to a corresponding terminal end portion of an adjacent magnetic flux circuit through a corresponding proximal via;

forming a second tip pole piece having a pole tip in said other layer of the film such that one end of said second tip pole piece is adapted for positioning adjacent to the magnetic medium for coupling magnetic flux between the medium and the yoke, and such that the other end of the second pole piece is connected to a corresponding terminal end portion of an adjacent magnetic flux circuit through a corresponding proximal via; and forming a coil to have a plurality of turn intertwined with the yoke and passing between the distal and proximal vias, so that the distal vias are exterior to the coil and the proximal vias are interior to the coil, to provide at least four magnetic flux interactions between the coil and the yoke.

7. The method for making the thin film magnetic transducer of claim 6 wherein the transducer has a lateral axis perpendicular to the longitudinal axis and the orienting step comprises orienting the easy axis of a plurality of the pole pieces to form an oblique angle of between 10° and 20° with the lateral axis of the transducer.

8. The method for making the thin film magnetic transducer of claim 7 wherein the orienting step comprises orienting the easy axis of a plurality of the pole pieces to form an oblique angle of substantially 15° with the lateral axis of the transducer.

9. The method for making the thin film magnetic transducer of claim 6 wherein the orienting step comprises orienting the easy axis of a plurality of the pole pieces to form an oblique angle of between 10° and 20° with the longitudinal axis of the transducer.

10. The method for making the thin film magnetic transducer of claim 9 wherein the orienting step comprises orienting the easy axis of a plurality of the pole pieces to form an oblique angle of substantially 15° with the longitudinal axis of the transducer.

11. The method for making the thin film magnetic transducer of claim 6 wherein the transducer has a lateral axis perpendicular to the longitudinal axis and the orienting step comprises
orienting the easy axis of a plurality of the pole pieces to form an oblique angle of between 10° and 20° with the lateral axis of the transducer, and
orienting the easy axis of a plurality of the pole pieces to form an oblique angle of between 10° and 20° with the longitudinal axis of the transducer.

12. A method for manufacturing a thin film magnetic transducer from a film having a plurality of layers, comprising the steps of first depositing at least one magnetic pole piece onto the first layer of a substrate in the presence of a magnetic field to induce an easy axis in the deposited pole pieces having a first orientation substantially perpendicular to a flux conduction path lying along a line of sight extending between the respective centers of two spaced-apart areas where vias are to be subsequently formed on each firstly deposited pole piece, reorienting the substrate relative to the magnetic field and secondly depositing at least one magnetic pole piece onto the first layer of the substrate in the presence of the magnetic field to induce an easy axis in the second deposited pole pieces having a second orientation different from said first orientation and substantially perpendicular to a flux conduction path lying along a line of sight extending between the respective centers of two spaced-apart areas where vias are to be subsequently formed on each secondly deposited pole piece, forming at least one electrical coil layer onto the first layer of the substrate, and at least one insulating layer onto the electrical coil layer of the substrate, said insulating layer being formed with an opening above each area on the firstly and secondly deposited pole pieces where one of said vias is to be formed, reorienting the substrate relative to the magnetic field and thirdly depositing at least one magnetic pole piece onto the insulating layer of the substrate, each thirdly deposited pole piece covering two of said insulating layer openings such that corresponding ones of said vias are thereby formed, and each thirdly deposited pole piece being deposited in the presence of the magnetic field to induce an easy axis therein having a third orientation substantially perpendicular to a flux conduction path lying along a line of sight extending between the respective centers of the vias formed thereby, and reorienting the substrate relative to the magnetic field and fourthly depositing at least one magnetic pole piece onto the insulating layer of the substrate, each fourthly deposited pole piece covering two of said insulating layer openings such that corresponding ones of said vias are thereby formed, and each fourthly deposited pole piece being deposited in the presence of the magnetic field to induce an easy axis therein having a fourth orientation different from said third orientation and substantially perpendicular to a flux conduction path lying along a line of sight extending between the respective centers of the vias formed thereby.

13. The method for manufacturing the thin film magnetic transducer of claim 12, wherein the first and third orientations are different from one another.

14. The method for manufacturing the thin film magnetic transducer of claim 12, wherein forming the electrical coil layer further comprises hard baking the substrate, and the first and second depositing pole piece steps each further comprise the step of adjusting the orientation of the substrate relative to the magnetic field to compensate for reduction in the first and second easy axis orientations due to the hard baking step.

15. The method for manufacturing the thin film magnetic transducer of claim 12, wherein the pole pieces comprise NiFe.

* * * * *